US012793432B2

(12) United States Patent
Wolfe et al.

(10) Patent No.: US 12,793,432 B2
(45) Date of Patent: Nov. 10, 2026

(54) PERSON SUPPORT APPARATUSES INCLUDING IMAGING DEVICES FOR DETECTING HAZARDOUS OBJECTS AND METHODS FOR USING SAME

(71) Applicant: Hill-Rom Services, Inc., Batesville, IN (US)

(72) Inventors: Gene Wolfe, Pittsford, NY (US); Neal Wiggerman, Batesville, IN (US); Robert Mark Zerhusen, Cincinnati, OH (US); Nicholas Mann, Cincinnati, OH (US); Christopher Nelson, Longmount, CO (US); Angela Williams, Midlothian, VA (US)

(73) Assignee: HILL-ROM SERVICES, INC., Batesville, IN (US)

( * ) Notice: Subject to any disclaimer, the term of this patent is extended or adjusted under 35 U.S.C. 154(b) by 485 days.

(21) Appl. No.: 18/454,426

(22) Filed: Aug. 23, 2023

(65) Prior Publication Data

US 2024/0071098 A1 Feb. 29, 2024

Related U.S. Application Data

(60) Provisional application No. 63/402,518, filed on Aug. 31, 2022.

(51) Int. Cl.
*G06V 20/58* (2022.01)
*G06T 7/20* (2017.01)
(Continued)

(52) U.S. Cl.
CPC ................ *G06V 20/58* (2022.01); *G06T 7/20* (2013.01); *G06V 10/764* (2022.01); *G06V 40/10* (2022.01); *G08B 21/02* (2013.01)

(58) Field of Classification Search
CPC .... G08B 21/02; G08B 21/22; G08B 21/0461; G08B 21/0438; G08B 21/0476;
(Continued)

(56) References Cited

U.S. PATENT DOCUMENTS

| | | | | |
|---|---|---|---|---|
| 5,760,826 A * | 6/1998 | Nayar | .................... | G02B 13/06 348/36 |
| 8,446,288 B2 | 5/2013 | Mizushima et al. | | |

(Continued)

FOREIGN PATENT DOCUMENTS

| | | | | |
|---|---|---|---|---|
| CN | 110522576 A * | 2/2019 | ............. | A61G 7/051 |
| JP | 2004024370 A | 1/2004 | | |

(Continued)

OTHER PUBLICATIONS

International Search Report and Written Opinion for Appln. No. PCT/US 23/73051 mailed Feb. 8, 2024, 13 pages.

(Continued)

*Primary Examiner* — Chineyere Wills-Burns
*Assistant Examiner* — Emmanuel Silva-Avina
(74) *Attorney, Agent, or Firm* — Dinsmore & Shohl LLP

(57) ABSTRACT

An apparatus includes a controller configured to: analyze image data within an area; determine an object is present in the area based on the image data; determine if the object is a potential hazard based on the image data; and in response to determining the object is a potential hazard, emitting a projection beam onto a surface of the area to illuminate the object.

12 Claims, 17 Drawing Sheets

(51) Int. Cl.

| | |
|---|---|
| ***G06V 10/764*** | (2022.01) |
| ***G06V 40/10*** | (2022.01) |
| ***G08B 21/02*** | (2006.01) |

(58) Field of Classification Search

CPC .......... G08B 5/36; G06T 7/20; G06V 10/764; G06V 20/52; G06V 20/58; G06V 40/10; G06V 40/103

USPC .......................................................... 382/103

See application file for complete search history.

(56) References Cited

U.S. PATENT DOCUMENTS

| | | | | |
|---|---|---|---|---|
| 8,641,196 | B2 | 2/2014 | Wakabayashi | |
| 9,486,084 | B2 | 11/2016 | Connell et al. | |
| 10,345,686 | B2 | 7/2019 | Muramatsu | |
| 10,648,659 | B2 | 5/2020 | Jonsson et al. | |
| 10,918,546 | B2 | 2/2021 | Zerhusen et al. | |
| 11,135,110 | B2 | 10/2021 | Zerhusen et al. | |
| 11,170,626 | B2 | 11/2021 | Pietrocola et al. | |
| 2009/0211026 | A1 | 8/2009 | Schoff | |
| 2011/0267179 | A1 | 11/2011 | Patterson | |
| 2014/0176735 | A1* | 6/2014 | Short | G03B 15/00 348/207.1 |
| 2016/0110982 | A1 | 4/2016 | Chin et al. | |
| 2017/0258664 | A1 | 9/2017 | Purcell | |
| 2017/0337820 | A1* | 11/2017 | Glatfelter | G08G 1/166 |
| 2017/0345275 | A1 | 11/2017 | Ribble et al. | |
| 2017/0354564 | A1 | 12/2017 | Dirauf et al. | |
| 2019/0043331 | A1* | 2/2019 | Eulloqui | G08B 21/0469 |
| 2019/0365592 | A1 | 12/2019 | Norton et al. | |
| 2019/0385430 | A1* | 12/2019 | Criado-Perez | G06F 18/2415 |
| 2020/0050206 | A1 | 2/2020 | Deyle et al. | |
| 2020/0118411 | A1 | 4/2020 | Wiggermann et al. | |
| 2020/0405189 | A1 | 12/2020 | Otsuki et al. | |
| 2020/0408386 | A1 | 12/2020 | Heimbrock | |
| 2021/0114514 | A1 | 4/2021 | Karol | |
| 2021/0236022 | A1 | 8/2021 | Shugert et al. | |
| 2021/0241894 | A1 | 8/2021 | Dixon et al. | |
| 2021/0379407 | A1 | 12/2021 | Thieme-Marti et al. | |
| 2022/0023122 | A1 | 1/2022 | Zerhusen et al. | |
| 2022/0171412 | A1 | 6/2022 | Cui et al. | |
| 2022/0211568 | A1 | 7/2022 | AlGhazi et al. | |
| 2023/0288934 | A1 | 9/2023 | Yahata | |

FOREIGN PATENT DOCUMENTS

| | | | |
|---|---|---|---|
| KR | 2022-0004861 | A | 1/2022 |
| WO | 2018148713 | A1 | 8/2018 |
| WO | 2021102427 | A1 | 5/2021 |
| WO | 2022138476 | A1 | 6/2022 |

OTHER PUBLICATIONS

Supplementary Search Report issued in EP Application No. 23861482.0 on Oct. 28, 2025.

Extended European Search Report issued in EP Patent Application No. 23861482.0 dated Jan. 26, 2026.

* cited by examiner

PERSON SUPPORT APPARATUSES INCLUDING IMAGING DEVICES FOR DETECTING HAZARDOUS OBJECTS AND METHODS FOR USING SAME

CROSS-REFERENCE TO RELATED APPLICATION

This application claims the benefit of U.S. Provisional Patent Application No. 63/402,518, filed Aug. 31, 2022, for "Person Support Apparatuses Including Imaging Devices For Detecting Hazardous Objects And Methods For Using Same," which is hereby incorporated by reference in its entirety including the drawings.

TECHNICAL FIELD

The present specification generally relates to person support apparatuses for detecting hazardous objects and, more specifically, methods for drawing attention and/or notifying others of hazardous objects.

BACKGROUND

Inpatient falls are a predominant clinical problem and a leading cause of preventable patient injury. Patient falls also affect hospital reimbursement and quality scores. Additionally, slips, trips, and falls are the second most common type of injury in health care workers resulting in missed work-days. Falls commonly occur around the hospital bed, in the bathroom, and on the path between. A common cause of a fall is a slip or trip on potential hazards such as liquids, cables, lines, linens, disposables, personal belongings, trash, and the like. These problems are exacerbated by several challenges for both patients and caregivers such as, for example, unfamiliarity with the environment, lack of awareness of environmental changes, slow visual accommodation from transition from light to dark, and the like. Failure to detect such potential hazards around the hospital bed can also pose a problem for patient transport due to the large number of hospital beds and the congested hospital environment.

Accordingly, a need exists for improved systems and methods for detecting potential hazards and drawing attention to the potential hazards so that the possibility of falls may be reduced.

SUMMARY

In one embodiment, an apparatus includes: a controller configured to: analyze image data within an area; determine an object is present in the room based on the image data; determine if the object is a potential hazard based on the image data; and in response to determining the object is a potential hazard, emitting a projection beam onto a surface of the room to illuminate the object.

In another embodiment, an apparatus includes: a controller configured to: determine that the apparatus is moving based on moving data; and instruct an image projection device to emit a projection beam indicating a moving direction of the apparatus based on the moving data.

In yet another embodiment, a method includes: capturing image data within a room; analyzing the captured image data; determining an object is present in the room based on captured image data; determining if the object is a potential hazard based on the captured image data; and in response to determining the object is a potential hazard, emitting a projection beam onto a surface of the room to illuminate the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
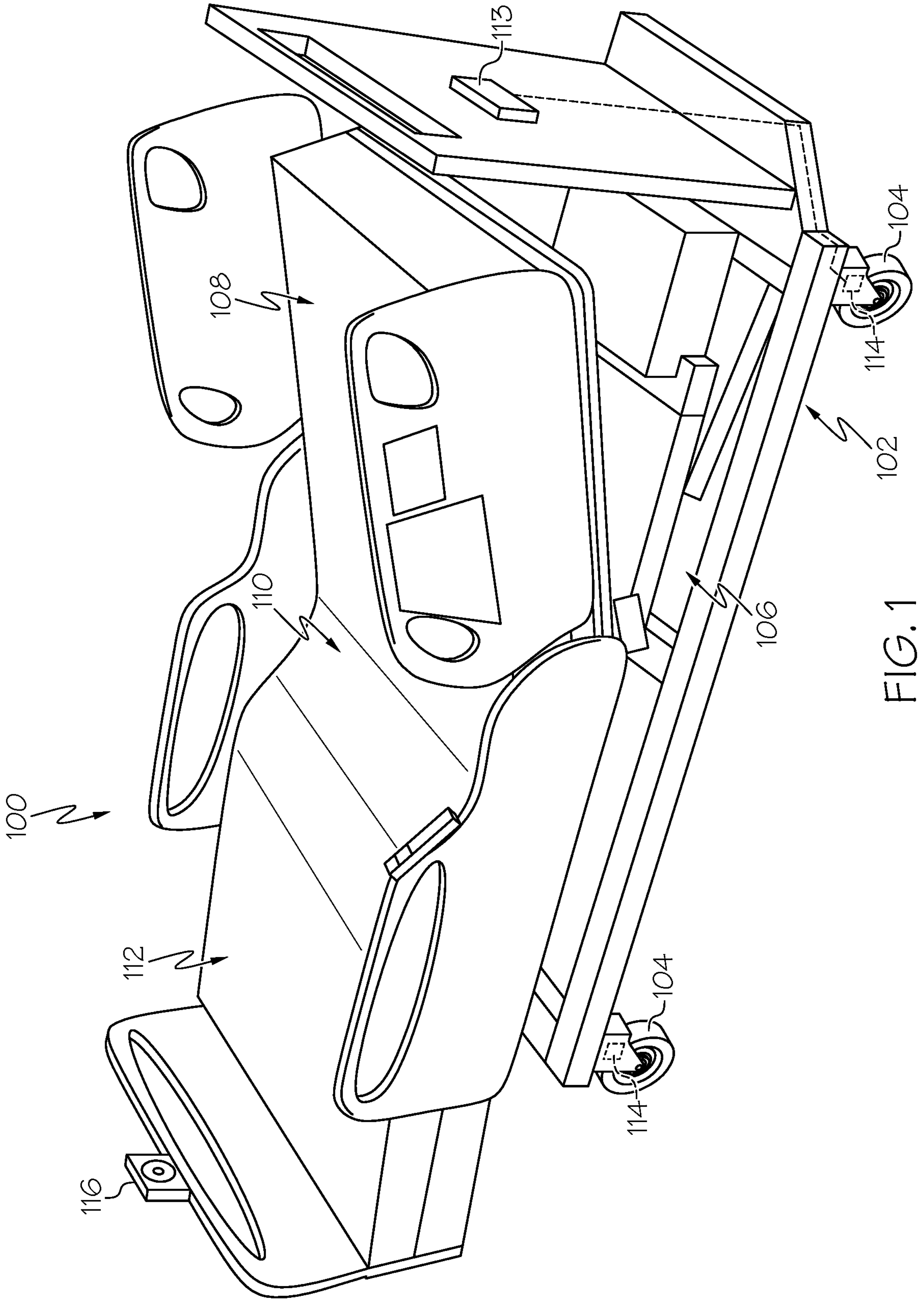
FIG. 1 schematically depicts a perspective view of a person support apparatus, according to one or more embodiments shown and described herein.

Embodiments described herein are directed to person support apparatuses that identify objects within a room or area in which the person support apparatuses are located and provides and alert when the object is classified as a potential hazard.

The person support apparatuses may include an image capture device for capturing image data within an area, an image projection device for emitting a projection beam onto a floor surface of an area, and a controller coupled to the image capture device and the image projection device. The controller is configured to analyze the image data captured by the image capture device, determine an object is present in the area based on image data captured by the image capture device, determine if the object is a potential hazard based on the captured image data; and in response to determining the object is a potential hazard, emitting a projection beam onto the floor surface of the area to illuminate the object. Various embodiments of the person support apparatus operation of the person support apparatus are described in more detail herein. Whenever possible, the same reference numerals will be used throughout the drawings to refer to the same or like parts.

As referred to herein a "hazard" or a "potential hazard" refers to any object within an area in an undesirable position, state, or location such as, for example, a medical line draping across the floor surface of the area near the patient support apparatus, a liquid spill on the floor surface, and the like. As described herein, a hazard or potential hazard may also refer to a state of a person in the area including, for example, footwear of the person. Additionally, a hazard or potential hazard may also refer to moving or non-moving objects approaching the person support apparatus such as when the person support apparatus is moving down a hallway. Although reference may be made herein to a room in which the person support apparatus and the potentially hazardous area is located, it should be appreciated that reference may also be made to an area without deviating from the scope of the present disclosure.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a person support apparatus 100 is illustrated according to one or more embodiments described herein. The person support apparatus 100 can be, for example, a hospital bed, a stretcher, a subject lift, a chair, an operating table, or similar support apparatuses commonly found in care facilities such as hospitals, nursing homes, rehabilitation centers, or the like. As shown in FIG. 1, the person support apparatus 100 includes a base frame 102 including a plurality of wheels or casters 104 that are movable along a floor surface. Although not shown, one or more lift members may extend from the base frame 102 and support a support frame 106 positioned above the base frame 102. A first end of each lift member is coupled to the base frame 102 and an opposite end of each lift member is coupled to the support frame 106. Thus, the support frame 106 is supported by the lift members above the base frame 102 such that the support frame 106 is movable relative to the base frame 102. In embodiments, the ends of the lift members may be rotatably attached to the base frame 102 and the support frame 106 to allow the ends of the lift members to rotate relative to the base frame 102 and the support frame 106 as the support frame 106 is raised. In embodiments, the support frame 106 has a head section 108, a seat section 110, and a foot section 112, with the seat section 110 located between the head section 108 and the foot section 112. The head section 108 and the foot section 112 are pivotable relative to the seat section 110.

In embodiments, the person support apparatus 100 may be a manually operated vehicle such that the person support apparatus 100 is movable by an operator pushing or pulling the person support apparatus 100. In this embodiment, the casters 104 are passively operated and permit the person support apparatus 100 to roll along a floor surface. In other embodiments, the person support apparatus 100 may include a drive mechanism 113 for controlling movement of the person support apparatus 100. Specifically, the drive mechanism 113 may be an electronic control unit coupled to a controller 306 (FIG. 3) and include a motor 114 operatively connected to each of the casters 104, either directly or through a transmission. The drive mechanism 113 may send instruction to the motors 114 to rotate the casters 104 in a forward direction or a rearward direction to move the person support apparatus 100 either in response to a command of an operator or, in embodiments, in response to receiving navigation instructions. As such, in embodiments, the person support apparatus 100 may be an autonomously or partially autonomously driven vehicle. In embodiments, the person support apparatus 100 may include four motors 114 with each motor 114 coupled to respective caster 104. In embodiments, the drive mechanism 113 may include an accelerometer, a gyroscope or similar motion detection device for detecting movement of the person support apparatus 100.

In embodiments, the person support apparatus 100 may further include an alarm device 116. The alarm device 116 may include an audio emitting device for emitting an audible alert when an alarm condition is satisfied, such as when a potential hazard or other another potentially hazardous condition is detected, as described herein. In embodiments, one or more of a frequency and volume of the audible alert may increase as a function of time after a potential hazard is first detected. In embodiments, the alarm device 116 may also include a visual alarm device for displaying a visual alert when the alarm condition is satisfied. The visual alert may include flashing lights, text indicating a potential hazard and/or a location of the potential hazard.

As shown, the alarm device 116 is mounted to the person support apparatus 100 proximate the foot section 112. However, it should be appreciated that the alarm device 116 may be mounted to any suitable location of the person support apparatus 100. In other embodiments, the alarm device 116 may be positioned at a remote location from the support frame 106. As described in more detail herein, the alarm device 116 may provide an audible and/or visual alert of a potential hazard or condition in which a person, such as a patient or medical provider, should be made aware. As such, in embodiments, the alarm device 116 may be located at any suitable location to notify someone of a condition which requires attention in a room or area in which the person support apparatus 100 is located.

Figure 2:
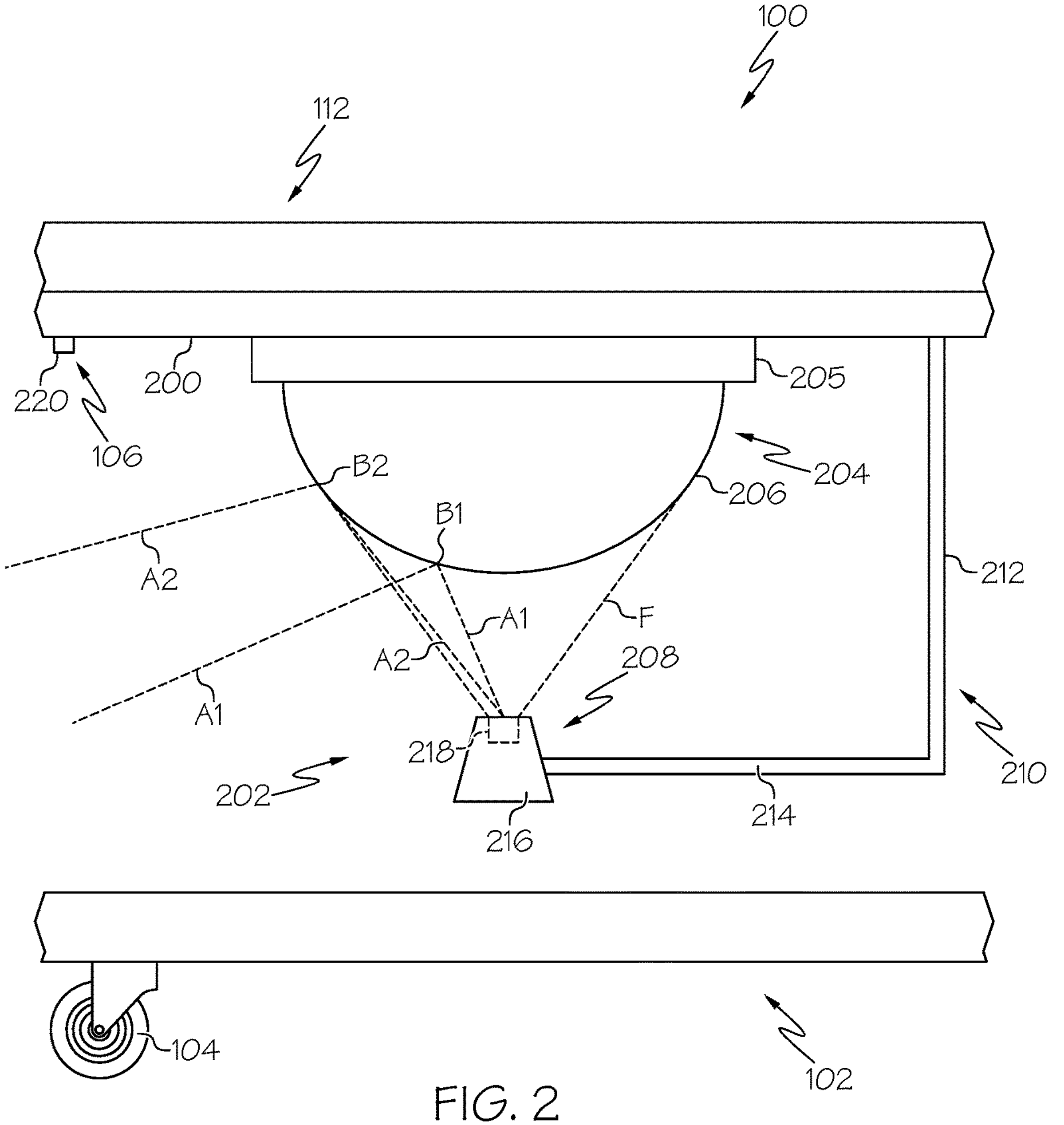
FIG. 2 schematically depicts a partial side view of the person support apparatus of FIG. 1, according to one or more embodiments shown and described herein.

Referring now to FIG. 2, a partial side view of the person support apparatus 100 is illustrated. As depicted, the support frame 106 is positioned above the base frame 102 and includes a lower surface 200, which faces the base frame 102. In embodiments, an optical projection system 202 is positioned between the support frame 106 and the base frame 102. As described in more detail herein, the optical projection system 202 detects objects around the person support apparatus 100, which may be determined to be a potential hazard to an occupant in the area with the person support apparatus 100, and illuminates the object to alert the occupant of the object and/or displays a path to avoid the object.

In embodiments, the optical projection system 202 is mounted to the lower surface 200 of the support frame 106. In embodiments, the optical projection system 202 includes a mirrored dome 204 mounted to the lower surface 200 of the support frame 106 by a mounting panel 205. As such, the mounting panel 205 may be mounted to the lower surface 200 of the support frame 106 and the mirrored dome 204 may be mounted to the mounting panel 205 in any suitable manner such as by fasteners, adhesives, or the like. The mirrored dome 204 includes a reflective outer surface 206 which allows the mirrored dome 204 to reflect light in a complete 360 degree field of view around the person support apparatus 100.

The optical projection system 202 further includes an imaging device 208 positioned between the support frame 106 and the base frame 102 and having a field of view directed at the mirrored dome 204. Specifically, the imaging device 208 is located directly below the mirrored dome 204 between the mirrored dome 204 and the base frame 102, and oriented such that the field of view of the imaging device 208 is directed in an upward vertical direction towards the mirrored dome 204.

The imaging device 208 may be mounted below the mirrored dome 204 by a mounting arm 210 extending from the support frame 106 and, more specifically, the lower surface 200 of the support frame 106. As depicted, the mounting arm 210 includes a first portion 212 extending in a vertical direction from the lower surface 200 of the support frame 106 and a second portion 214 extending in a horizontal direction from an end of the first portion 212 opposite the lower surface 200 of the support frame 106. The imaging device 208 is then mounted to an end of the second portion 214 of the mounting arm 210 opposite the first portion 212 of the mounting arm 210. However, it should be appreciated that the first portion 212 and the second portion 214 of the mounting arm 210 may extend at any suitable direction from the lower surface 200 of the support frame 106 to position the imaging device 208 below the mirrored dome 204. Additionally, it should be appreciated that the mounting arm 210 may be thin in cross section or constructed of transparent material to prevent substantial obstruction of light directed on to or reflected off the mirrored dome 204.

The imaging device 208 includes an image capture device 216 and an image projection device 218. The image capture device 216 may be a camera or the like configured to capture image data reflected by the mirrored dome 204 within a field of view of the image capture device 216. In some embodiments, the image capture device 216 may include one or more optical components, such as a mirror, fish-eye lens, or any other type of lens. In some embodiments, the image capture device 216 includes one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein could include one or more LIDAR sensors, radar sensors, sonar sensors, or other types of sensors and that such data could be integrated into or supplement the data collection described herein.

As depicted, the image capture device 216 has a field of view F directed toward the mirrored dome 204 and wide enough to capture image data of the entire outer surface 206 of the mirrored dome 204. The field of view F of the image capture device 216 extends across an entire diameter of the mirrored dome 204 so that the entire outer surface 206 of the mirrored dome 204 may be viewed by the image capture device 216. Accordingly, the image capture device 216 is able to "view" any object in the area surrounding the person support apparatus 100 below a plane of the support frame 106 based on light that is incident on the outer surface 206 of the mirrored dome 204. It should be appreciated that light from certain objects may be obstructed from being incident on and reflected by the outer surface 206 of the mirrored dome 204 by the mounting arm 210 or other components of the person support apparatus 100 extending between the support frame 106 and the base frame 102. Accordingly, the image capture device 216 collects image data of an area surrounding the person support apparatus 100 below the plane of the support frame 106. As described in more detail herein, the image data is transmitted to the controller 306 (FIG. 3), which processes the image data.

The image projection device 218 may be a projector, such as a digital light processing (DLP) projector, liquid-crystal display (LCD) projector, light-emitting diode (LED) projector, liquid crystal on silicon (LCOS) projector, laser projector, or the like, capable of projecting an image onto the floor surface of the room around the person support apparatus 100. As the mirrored dome 204 is capable of reflecting an entire 360 degree view, the image projection device 218 is able to project a display or illuminate a particular portion of the floor surface by emitting a projection at a corresponding location of the mirrored dome 204 corresponding with an area of the floor surface on which the projection is to be directed. It should be appreciated that the image projection device 218 may include any suitable projection control device, such as a motor or the like, for controlling an angle at which a projection beam is emitted from the image projection device 218 relative to the mirrored dome 204. In embodiments, the projection control device may adjust an orientation of the image projection device 218 itself relative to the mirrored dome 204 or, in embodiments, the projection control device may control an orientation of a lens of the image projection device 218 through which the projection beam is emitted. Thus, the projection beam emitted from the image projection device 218 may be directed toward any specific location of the outer surface 206 of the mirrored dome 204 corresponding to a location of a particular object or location on the floor surface. For example, the image projection device 218 may emit a first projection beam A1 at a first location B1 of the outer surface 206 of the mirrored dome 204. The first projection beam A1 is then reflected off the outer surface 206 of the mirrored dome 204 at the first location B1 and redirected toward a first location of the floor surface. Similarly, the image projection device 218 may emit a second projection beam A2 at a second location B2 of the outer surface 206 of the mirrored dome 204. The second projection beam A2 is then reflected off the outer surface 206 of the mirrored dome 204 at the second location B2 and redirected toward a second location of the floor surface. Because the first location B1 on the outer surface 206 of the mirrored dome 204 is spaced apart from the second location B2 of the outer surface 206 of the mirrored dome 204, the projection displayed at the first location on the floor surface will similarly be spaced apart from the second location on the floor surface. It should be appreciated that the first projection beam A1 and the second projection beam A2 may be simultaneously emitted by the image projection device 218 to project separate displays on the floor surface.

In embodiments, the image projection device 218 may be integrated into the image capture device 216 such that the image capture device 216 and the image projection device 218 each have a field of view directed toward the mirrored dome 204. In other embodiments, the image projection device 218 may be separate from and spaced apart from the image capture device 216. Although the optical projection system 202 is disclosed herein as being mounted or coupled to the person support apparatus 100, it should be appreciated that the optical projection system 202 may be provided on any suitable support structure such as, for example, an overhead lift, a bedside chair, an IV pole of a person support apparatus or cart, or the like. In addition, the image capture device 216 may be located or mounted on one support device and the image projection device 218 may be located on a separate support device, such as one provided at a different location within the room. This would allow for a greater degree of object detection and projection at a location separate from a detected object.

The optical projection system 202 may be located at any suitable location along the lower surface 200 of the support frame 106. For example, the optical projection system 202 may be located proximate an end of the person support apparatus 100 such as at the foot section 112. However, it should be appreciated that the optical projection system 202 may alternatively be located at the head section 108 or the seat section 110. Moreover, it should be appreciated that a plurality of optical projection systems 202 may be provided at, for example, respective corners of the lower surface 200 of the support frame 106 with each optical projection system 202 including mirrored dome 204, an imaging device 208 for capturing image data reflecting from the mirrored dome 204, and an image projection device 218 for emitting a projection beam toward a respective mirrored dome 204. In this embodiment, the outer surface 206 of each mirrored dome 204 may be narrowed or reduced in size to restrict the area of the floor surface on which a respective image projection device 218 is permitted to emit a projection beam. Thus, each image capture device 216 is responsible for detecting objects within a specific quadrant of the room in which the person support apparatus 100 is located and each image projection device 218 is restricted to emitting a projection beam on a specific quadrant of the floor surface near the person support apparatus 100.

Although reference is made herein to the image projection device 218 including the mirrored dome 204 for reflecting a projection beam onto the floor surface of the room, it should be appreciated that the image capture device 216, or a plurality of image capture devices 216, may capture image data of the room without the mirrored dome 204. Additionally, image projection device 218 may project the projection beam may be emitted directly onto the floor surface without reflecting the projection beam off the mirrored dome 204.

In addition, one or more sensors 220 may be provided for further detecting an object surrounding the person support apparatus 100. It should be appreciated the sensor 220 may include a conventional optical camera, LiDAR sensor, depth imager, millimeter wave camera, thermal camera, or a combination thereof to detect objects that could pose a potential hazard to a person in the room. As shown in FIG. 2, the sensor 220 is provided at the lower surface 200 of the support frame 106 of the person support apparatus 100. However, it should be appreciated that the sensor 220 may be provided at any suitable location of the person support apparatus 100 or separate from the person support apparatus 100.

Figure 3:
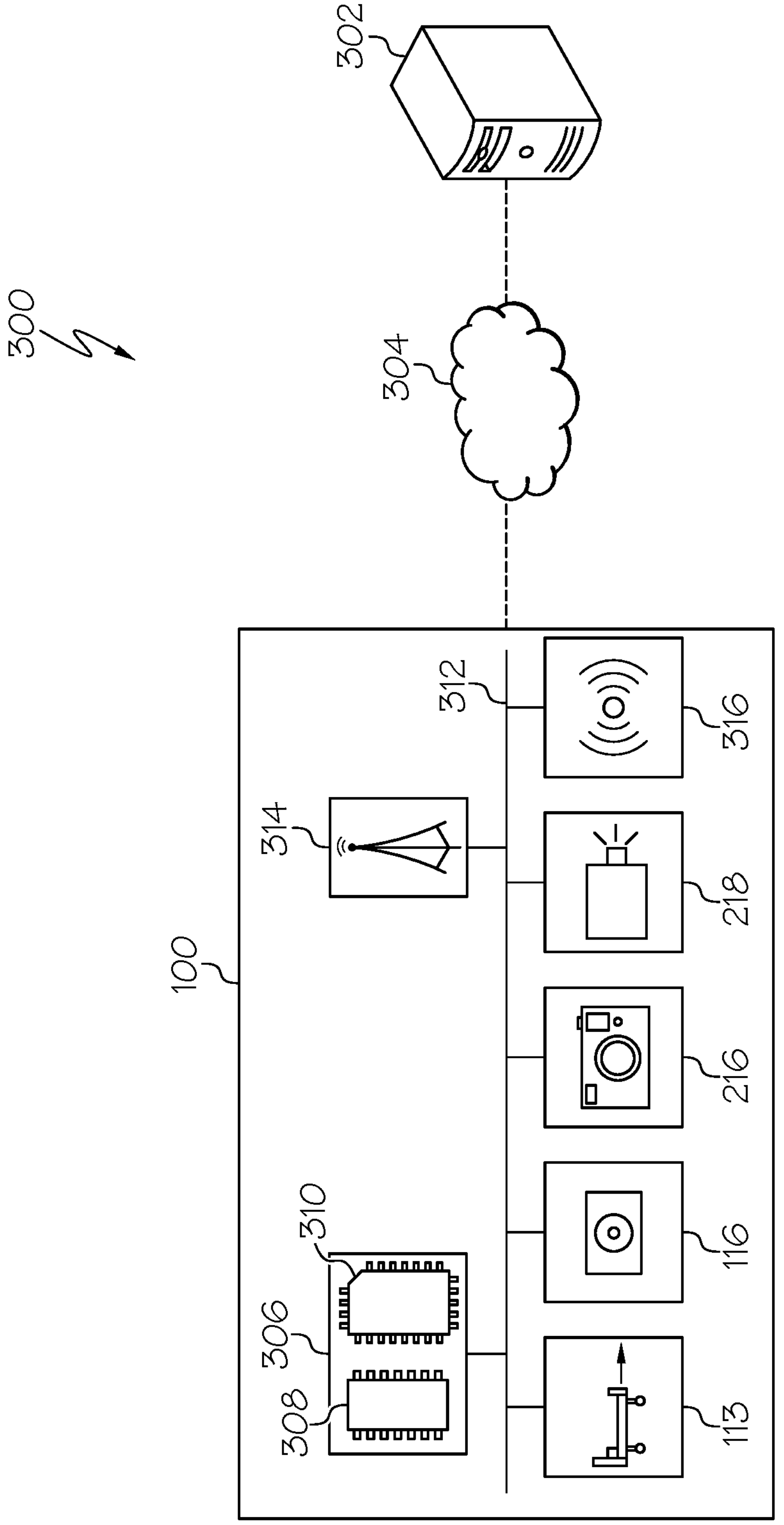
FIG. 3 schematically depicts components of a system including the person support apparatus of FIG. 1, according to one or more embodiments shown and described herein.

Referring now to FIG. 3, a system 300 is illustrated according to one or more embodiments described herein. The system 300 is depicted as generally including the person support apparatus 100 configured to communicate with a central monitoring station 302 via a network 304.

The person support apparatus 100 further includes a controller 306 including one or more processors 308 and one or more memory modules 310. Each of the one or more processors 308 may be any device capable of executing machine readable and executable instructions. Accordingly, each of the one or more processors 308 may be an integrated circuit, a microchip, a computer, or any other computing device. The one or more processors 308 are coupled to a communication path 312 that provides signal interconnectivity between various modules of the system 300. Accordingly, the communication path 312 may communicatively couple any number of processors 308 with one another, and allow the modules coupled to the communication path 312 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 312 may be formed from any medium that is capable of transmitting a signal such as, for example, conductive wires, conductive traces, optical waveguides, or the like. In some embodiments, the communication path 312 may facilitate the transmission of wireless signals, such as WiFi, Bluetooth®, Near Field Communication (NFC) and the like. Moreover, the communication path 312 may be formed from a combination of mediums capable of transmitting signals. In one embodiment, the communication path 312 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the system 300 includes one or more memory modules 310 coupled to the communication path 312. The one or more memory modules 310 may comprise RAM, ROM, flash memories, hard drives, or any device capable of storing machine readable and executable instructions such that the machine readable and executable instructions can be accessed by the one or more processors 308. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 310. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, the person support apparatus 100 includes network interface hardware 314 for communicatively coupling the person support apparatus 100 to the central monitoring station 302. The network interface hardware 314 can be communicatively coupled to the communication path 312 and can be any device capable of receiving and transmitting data via the network 304. Accordingly, the network interface hardware 314 can include a communication transceiver for sending and/or receiving any wired or wireless communication. For example, the network interface hardware 314 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 314 includes hardware configured to operate in accordance with the Bluetooth® wireless communication protocol.

Still referring to FIG. 3, the central monitoring station 302 may be a remote server such as a cloud server. In some embodiments, the central monitoring station 302 may be a local server including, but not limited to, an edge server, and the like. The person support apparatus 100 may communicate with the central monitoring station 302 in an area covered by the central monitoring station 302. In embodiments, the central monitoring station 302 may communicate with other servers that cover different areas. The central monitoring station 302 may communicate with a remote server and transmit information collected by the central monitoring station 302, such as image data collected by the person support apparatus 100, to the remote server.

The person support apparatus 100 may be communicatively coupled to the central monitoring station 302 by the network 304. In one embodiment, the network 304 may include one or more computer networks (e.g., a personal area network, a local area network, or a wide area network), cellular networks, satellite networks and/or a global positioning system and combinations thereof. Accordingly, the central monitoring station 302 can be communicatively coupled to the network 304 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

As discussed herein, in embodiments, the person support apparatus 100 includes the drive mechanism 113 for controlling rotation of the casters 104. The drive mechanism 113 is communicatively coupled to the other components of the person support apparatus 100, specifically the controller 306, via the communication path 312. In embodiments, the network interface hardware 314 of the person support apparatus 100 may receive a navigation request from the central monitoring station 302 indicating a navigation request to navigate the person support apparatus 100 to a destination. In response, the network interface hardware 314 may transmit the navigation request to the controller 306, which identifies a route to the destination and transmits control instructions including navigation instructions to the drive mechanism 113 of the person support apparatus 100.

As discussed herein, in embodiments, the person support apparatus 100 includes the alarm device 116. The alarm device 116 is communicatively coupled to the other components of the person support apparatus 100, specifically the controller 306, via the communication path 312. In response to the controller 306 detecting an object and classifying the object as a hazard, the controller 306 may operate the alarm device 116 to emit an audible and/or visual alert.

As discussed herein, the person support apparatus 100 includes the image capture device 216. The image capture device 216 is communicatively coupled to the other components of the person support apparatus 100, specifically the controller 306, via the communication path 312. The image data collected by the image capture device 216 is transmitted to the controller 306, which analyzes the collected image data, as discussed in more detail herein, to determine whether an object is present.

As discussed herein, the person support apparatus 100 includes the image projection device 218. The image projection device 218 is communicatively coupled to the other components of the person support apparatus 100, specifically the controller 306, via the communication path 312. In response to the controller 306 determining whether an alarm condition is satisfied and an alarm action should be taken, the controller 306 may send instruction to the image projection device 218 to emit one or more projection beams. In embodiments, a first projection beam may be emitted to illuminate an object identified as a potential hazard. In embodiments, a second projection beam may be emitted to display a path to be traversed so as to avoid the potential hazard. Although reference is made to the image projection device 218 emitting a projection "beam", it should be appreciated that the projection beam may include a plurality of projection beams to display any suitable shape, design, text, or the like on the floor surface.

In embodiments, the person support apparatus 100 includes a location sensor 316 communicatively coupled to the other components of the person support apparatus 100 via the communication path 312. The location sensor 316 may be, for example, a GPS module, configured to capture location data indicating a location of the person support apparatus 100, which may be transmitted to the central monitoring station 302. The location data may be utilized to determine an appropriate path to be projected by the image projection device 218 so that a potential hazard may be avoided.

Figure 4:
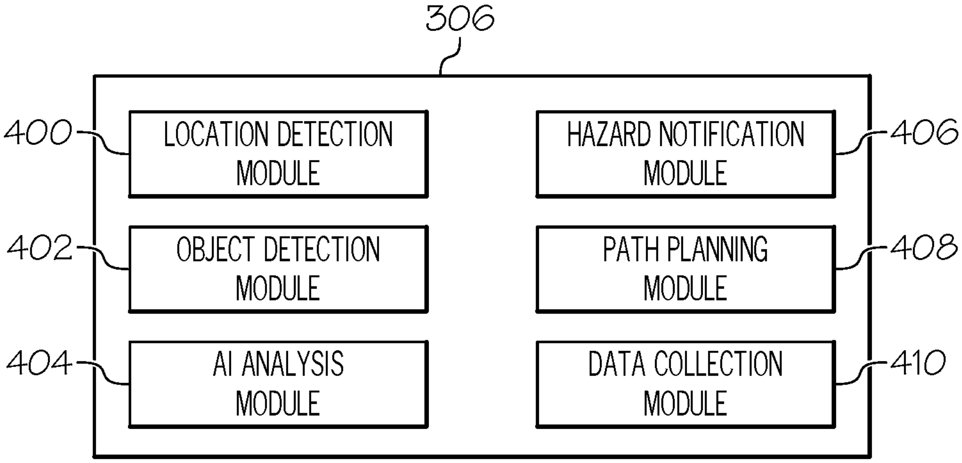
FIG. 4 schematically depicts modules of a controller of the person support apparatus of FIG. 1, according to one or more embodiments shown and described herein.

Referring now to FIG. 4, the controller 306 of the person support apparatus 100 is shown with reference to FIGS. 1-3. In embodiments, the controller 306 generally includes a location detection module 400, an object detection module 402, an artificial intelligence (AI) analysis module 404, a hazard notification module 406, a path planning module 408, and a data collection module 410. Each of the location detection module 400, the object detection module 402, the artificial intelligence (AI) analysis module 404, the hazard notification module 406, the path planning module 408, and the data collection module 410 may be a program module in the form of operating systems, application program modules, and other program modules stored in the controller 306. Such a program module may include, but is not limited to, routines, subroutines, programs, objects, components, data structures and the like for performing specific tasks or executing specific data types as will be described below.

The location detection module 400 determines a location of the person support apparatus 100. In embodiments, the location detection module 400 determines a location of the person support apparatus 100 based on location data collected by the location sensor 316. In embodiments, the image capture device 216 may be utilized to determine and/or confirm a location of the person support apparatus 100. For example, the image capture device 216 may identify a location of one or more location indicators provided within the room of the person support apparatus 100. The location indicators may be a matrix barcode such as, for example, a quick response (QR) code, provided on a wall or the floor surface of the room or on any object within the room in which the person support apparatus 100 is located. The location indicators are reflected off the mirrored dome 204 and captured by the image capture device 216. The location indicators may each be assigned a particular location such that the location detection module 400 may determine a particular location and orientation of the person support apparatus 100 based on the collected image data captured by the image capture device 216 and transmitted to the controller 306. Specifically, the location of the person support apparatus 100 may be determined based on the particular location of each location indicator reflected on the mirrored dome 204.

The object detection module 402 determines whether an object is present within the room. In embodiments, the object detection module 402 may collect initial image data captured by the image capture device 216 when it is determined that no object or hazard is present within the room. Thereafter, the image capture device 216 will continuously collect additional image data and transmit the collected image data to the object detection module 402. The object detection module 402 then compares the additionally collected image data to the initially collected image data to determine whether an object is present in the room that was not present in the room during the collection of the initial image data. If the object detection module 402 determines that an object is present within the additionally collected image data that was not present in the initially collected image data, object data specific to the object detected may be extracted from the image data and transmitted to the AI analysis module 404. In embodiments, the image data collected by the image capture device 216, or in embodiments by the sensor 220, is converted with a Fourier transform to a frequency domain. A frequency threshold may be selected and frequencies below the frequency threshold are permitted, e.g., passed through, while frequencies at or above the frequency threshold are filtered. The captured image data may then be converted to a spatial domain and a threshold point, such as a grayscale intensity, is applied. The total area of the spatial domain is computed and if the total area is greater than a predetermined value, it may be determined that an object is detected within the captured image data and should be classified as a potential hazard. As discussed herein, one or more sensors 220 may be used to supplement the image data captured by the image capture device 216. For example, if the sensor 220 includes a thermal camera, a temperature of the detected object may be taken. In embodiments, the thermal camera may be used to determine whether the object, such as a person in the room, has a temperature exceeding a predetermined threshold indicative of a fever.

The AI analysis module 404 then analyzes the object data to identify the object detected within the object data and classify the object as a potential hazard or a non-hazard. The AI analysis module 404 includes a database of potentially hazardous objects, as well as characteristics for determining whether a detected object is a potential hazard. Example objects classified as a potential hazard may include, for example, a liquid on the floor surface, wires or cables extending along the support frame 106 of the person support apparatus 100, lack of proper footwear, and the like. For example, the AI analysis module 404 may determine that a liquid is present on the floor surface based on a detected level of reflection on the floor surface relative to other areas of the floor surface. As a liquid on the floor surface may increase the possibility of a person slipping, such an object may be classified as a potential hazard. In addition, the AI analysis module 404 may determine the type of footwear being worn by those entering the room. Specifically, the AI analysis module 404 may determine whether a person within the room is wearing socks or shoes on his or her feet. If the AI analysis module 404 determines that the person is not wearing proper footwear, for example gripping socks, this may be classified as a potential hazard. An example characteristic of an object used to determine whether the object should be classified as a potential hazard is a size of the object. If the detected object is determined to have a size exceeding a predetermined threshold, the object may be classified as a potential hazard.

In response to the AI analysis module 404 classifying an object as a potential hazard, the hazard notification module 406 will determine an appropriate response. For example, in embodiments, the hazard notification module 406 will send a signal to the alarm device 116 to emit an audible alarm and/or display an alert. In embodiments, the hazard notification module 406 may also control a movement of the person support apparatus 100 in instances in which the person support apparatus 100 is in motion. For example, the hazard notification module 406 may send a signal to the drive mechanism 113 to slow or stop the movement of the person support apparatus 100. In embodiments, the hazard notification module 406 will send a signal to the image capture device 216 and/or the sensor 220 to record a surrounding environment of the person support apparatus 100 to capture image data prior to a potential hazard occurring, such as a fall of a person within the room or a collision with an obstacle if the person support apparatus 100 is moving. In embodiments, the hazard notification module 406 will send a signal to the image projection device 218. The signal sent from the hazard notification module 406 to the image projection device 218 may include, for example, instructions for the image projection device 218 to emit a projection beam to illuminate the object classified as a potential hazard. As discussed herein, the projection beam is initially emitted toward the mirrored dome 204 and reflected toward the object onto the floor surface.

In embodiments, it may be determined that there is an increased risk that a person entering the room or exiting the person support apparatus 100 will encounter the object. As such, the path planning module 408 determines an appropriate path for the person to walk while in the room so that the object may be avoided. In determining the appropriate path for the person to walk, the path planning module 408 takes into account a location of the person support apparatus 100, determined by the location detection module 400, and known features of the room such as, for example, a location of the door, the bathroom, and the like. The path planning module 408 then determines a path for avoiding the object and sends the path to the hazard notification module 406. Thereafter, the signal sent from the hazard notification module 406 to the image projection device 218 may include, for example, instructions for the image projection device 218 to emit a projection beam to project the path for a person to walk from one location, such as a door of the room or a bathroom, to a second location, such as the person support apparatus 100, while avoiding the object.

The data collection module 410 collects hazard data associated with the room in which the person support apparatus 100 is located for purposes of, for example, evaluating response times in remediating a potential hazard. In embodiments, the data collection module 410 may include a timing device that determines an amount of time that a potential hazard is present, such as when a spill is present on the floor surface. For example, the data collection module 410 may determine a length of time between a first time when the object detection module 402 determines that an object is detected and a second time at which the object detection module 402 determines that the object is no longer detected, e.g., has been remedied or removed. The data collection module 410 may transmit this hazard data to the central monitoring station 302 via the network 304 to track which rooms may require additional attention based on whether an object classified as a potential hazard is present for a period of time exceeding a predetermined threshold or whether a number of potential hazards in excess of a predetermined threshold are detected within predetermined period of time.

In embodiments, the data collection module 410 may assist with the creation of a real-time map of potential hazards detected throughout a building, such as a hospital. In other embodiments, the real-time map may be created by the central monitoring station 302 based on the hazard data received from the data collection module 410. As such, customized reports may be created identifying which rooms, i.e., area or room identifying information transmitted by the person support apparatus 100 and received at the central monitoring station 302, having an increased incidence of potential hazards or slowest response times to address the potential hazards, a location of the most common potential hazards resulting in slips and falls such as, for example, while walking to the bathroom or next to the person support apparatus 100, demographics of those involved in an injury related to the potential hazard, and environmental conditions of the room such as, for example, room lights off, improper footwear, and the like.

Figure 5:
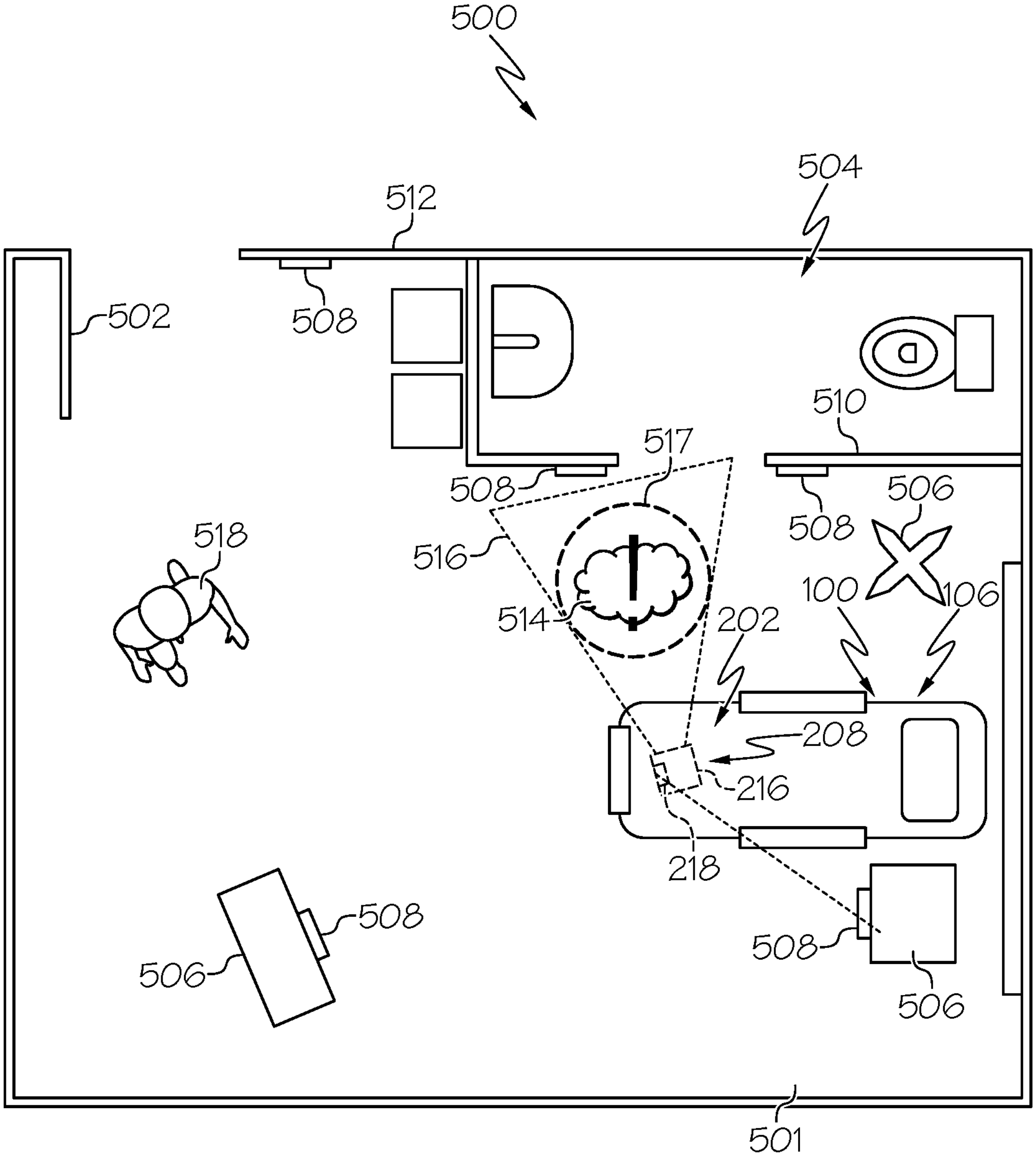
FIG. 5 schematically depicts a plan view of a room including the person support apparatus of FIG. 1 in which a projection beam is emitted to illuminate an object in the room, according to one or more embodiments shown and described herein.

Referring now to FIG. 5, an area or room 500 is depicted in which the person support apparatus 100 is positioned on a floor surface 501 of the room 500. As shown, the room 500 includes a door 502, a bathroom 504, and a plurality of items 506 within the room 500. The items 506 may be any typical items found in a standard medical room such as, for example, a bed end table, a medical IV pole, medical computer equipment, and the like. As shown, a location indicator 508 may be provided on any one or more of the items 506, as well as on a wall 510 of the bathroom 504 and a wall 512 near the door 502, or on the door 502 itself. As discussed herein, the image capture device 216 may detect one or more of these location indicators 508 and transmit a location of the location indicators 508 to the location detection module 400 so that a location of the person support apparatus 100 may be determined.

As discussed herein, the image capture device 216 captures image data within the room 500. As shown, an object 514 is present within the room 500 and within the field of view of the image capture device 216 based on the object 514 being reflected off the outer surface 206 of the mirrored dome 204 mounted below the support frame 106. The object data captured by the image capture device 216 is transmitted to the object detection module 402 and the AI analysis module 404 to determine whether the object 514 should be classified as a potential hazard. As shown in FIG. 5, when the object 514 is classified as a potential hazard, the image projection device 218 emits a projection beam 516 onto the floor surface 501 of the room 500. As depicted, the projection beam 516 projects, for example, a hazard icon 517 to surround the entirety of the object 514 and be displayed over the object 514. Illuminating the object 514 assists in drawing attention to the object 514 so that the object 514 may be avoided by those entering or already within the room 500, such as a person 518 within the room 500 walking toward the person support apparatus 100.

Figure 6:
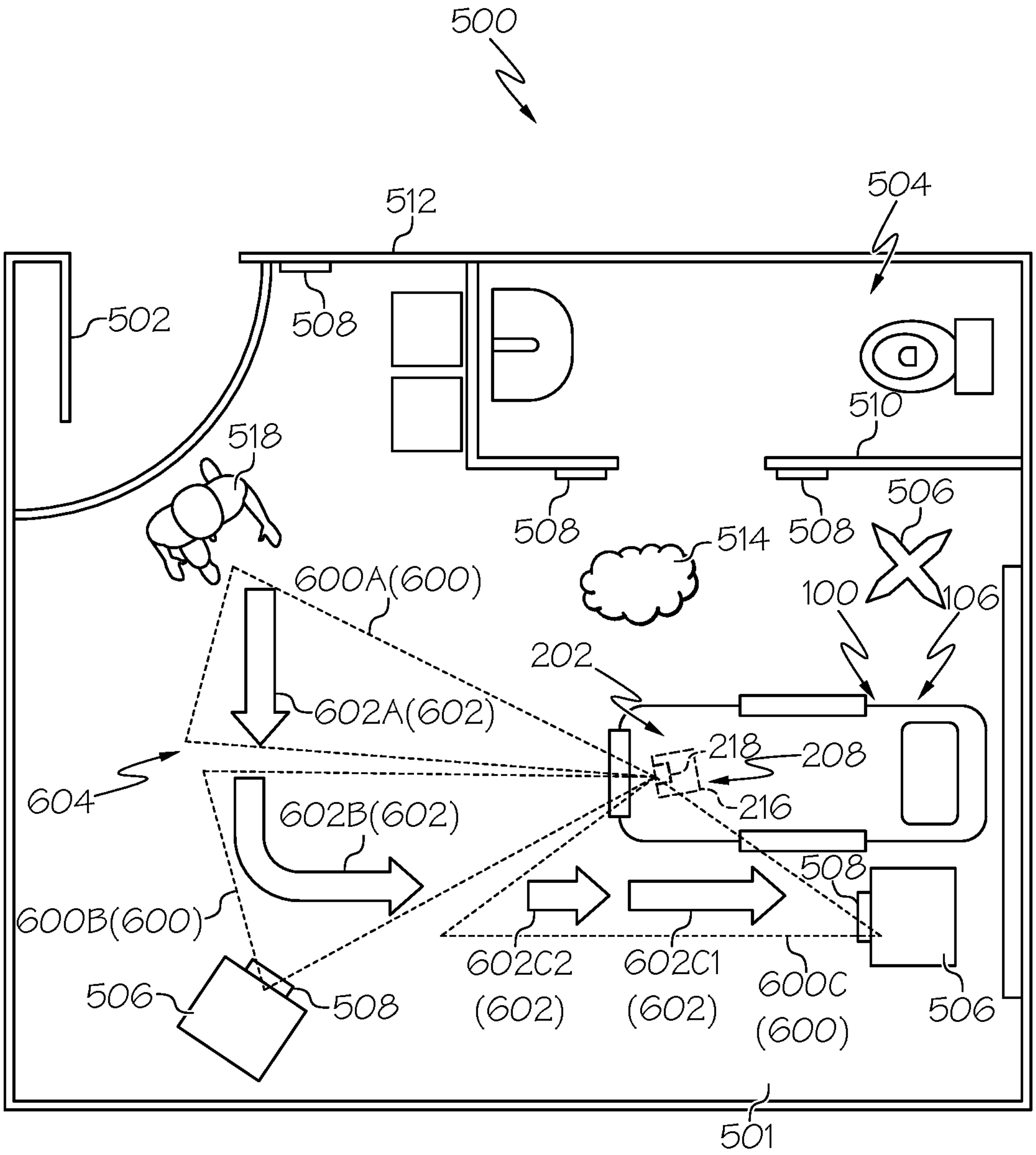
FIG. 6 schematically depicts a plan view of the room including the person support apparatus of FIG. 1 in which a projection beam is emitted to project a walking path to avoid the object, according to one or more embodiments shown and described herein.

Referring now to FIG. 6, the room 500 is depicted. However, in this embodiment, rather than illuminating the object 514, the image projection device 218 is shown emitting a projection beam 600 which projects a path 604 for the person 518 to walk from the door 502 of the room 500 to the person support apparatus 100 and avoid the object 514 classified as a potential hazard. In addition, the path 604 is designed or plotted to avoid any items 506 within the room 500 detected by the object detection module 402 based on a location of the person support apparatus 100 determined by the location detection module 400.

Specifically, image projection device 218 may emit a plurality of projection beams 600A-C at different locations on the floor surface 501 of the room 500. It should be appreciated that the projection beams 600A-C may be emitted from a single image projection device 218 or, in embodiments, a plurality of image projection devices 218 provided at various locations of the person support apparatus 100, or elsewhere located within the room 500. As shown, each projection beam 600A-C projects one or more arrows 602 defining a path 604 for the person 518 to walk along from the door 502 to the person support apparatus 100 to avoid the object 514. Specifically, the projection beam 600A displays an arrow 602A, the projection beam 600B displays an arrow 602B, and the projection beam 600C displays a pair of arrows 602C1, 602C2. It should be appreciated that although the projection beams 600A-C indicating a walking path of the person are not shown in combination with the projection beam 516 illustrated in FIG. 5, the image projection device 218 is capable of emitting the projection beam 516 and the projection beams 600A-C simultaneously to both notify a person of the object 514 and indicate a walking path to avoid the object 514.

Although examples of possible projections depicted herein include a projection beam 516 defining a hazard icon 517 to illuminate a hazard and projection beams 600A-C indicating a walking path, it should be appreciated that a projection beam may be projected to illuminate an object other than one determined to be a hazard. In embodiments, the image projection device 218 may be instructed to take a particular action in response to detecting a person getting out of the person support apparatus 100, determined by either the image capture device 216 or one or more other sensors coupled to the person support apparatus 100. For example, if stored emergency medical records of the person indicate that the person is designated ambulatory, the image projection device 218 may project a projection beam toward a walking assist device detected by the image capture device 216, such as a walker, to illuminate the walking assist device for the person. As another non-limiting example, if it is determined that the person is a fall risk and should not be permitted to stand alone based on the stored emergency medical records of the person, the image projection device 218 may project a projection beam to some location in the room clearly visible to the person to indicate that the person should return to the person support apparatus 100. In this embodiments, the projection beam may define a stop sign or some other indicia indicating that the person should not stand.

In addition to projecting the projection beams 600A-C to define a walking path for the person, it should be appreciated that the projection beams 600A-C may alternatively, or in combination therewith, indicate a walking path for a caregiver to an appropriate object. For example, in embodiments, the image capture device 216 may detect a location of a particular caregiver within the room 500 and project a walking path for the particular caregiver. In addition, a real-time locating system associated with the particular caregiver may assist in determining the particular caregiver that has entered the room 500. As a non-limiting example, if it is determined that a physical therapist has entered the room 500, based on the image capture device 216 and/or the real-time locating system, the image projection device 218 may emit a projection beam projecting a walking path from a current location of the physical therapist, such as the door 502, to a walker or gait belt. As another non-limiting example, if it is determined that a nurse has entered the room 500, based on the image capture device 216 and/or the real-time locating system, the image projection device 218 may emit a projection beam projecting a walking path from a current location of the nurse, such as the door 502, to the walker, gait belt, catheter bag, medication or the like. As another non-limiting example, if it is determined that a non-clinical staff member has entered the room 500, based on the image capture device 216 and/or the real-time locating system, the image projection device 218 may emit a projection beam projecting a walking path from a current location of the non-clinical staff member, such as the door 502, to a food tray. In any of the above embodiments, it should be appreciated that the particular objects may merely be illuminated by the image projection device 218 rather than a walking path to the particular objects being projected. The image projection device 218 may also be utilized to illuminate lost belongings of a person or caregiver such as, for example, a cell phone, cell phone charger, water bottle, or the like, detected by the image capture device 216.

Figure 7:
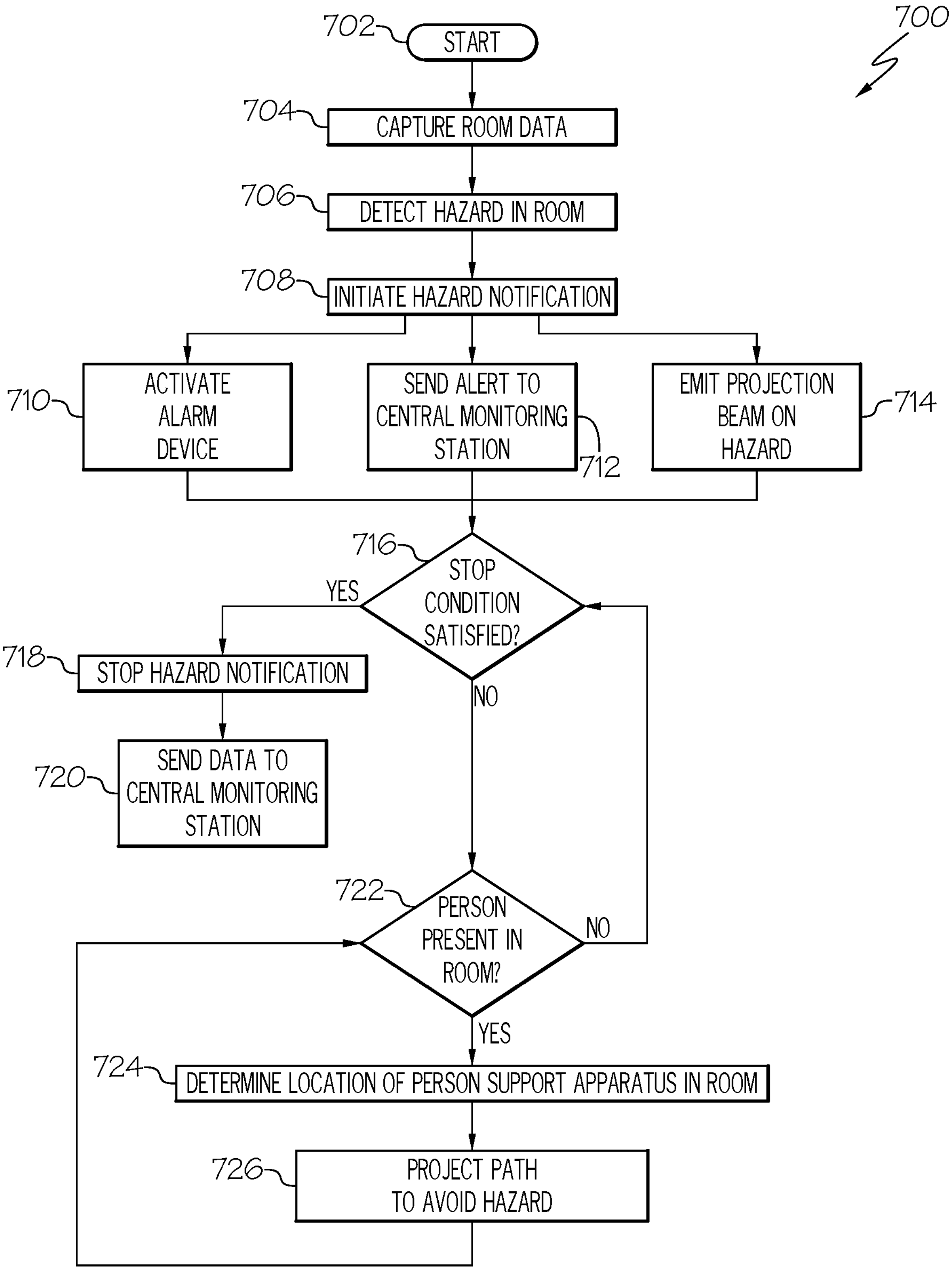
FIG. 7 depicts a flowchart of a method for emitting a projection beam to illuminate an object classified as a hazard and a path to avoid the object, according to one or more embodiments shown and described herein.

FIG. 7 depicts a method 700 for alerting a person of an object classified as a potential hazard so that the object may be avoided and addressed by appropriate personnel. The method 700 is described herein with reference to FIGS. 1-6.

Initially, at step 702, the method 700 starts by activating the imaging device 208 of the person support apparatus 100. Specifically, activating the imaging device 208 includes powering at least the image capture device 216 so that image data surrounding the person support apparatus 100 may be collected and a potentially hazardous object identified. At step 704, the image capture device 216 collects initial image data of the room 500 and the initial image data is transmitted to the controller 306. Subsequently, the image capture device 216 continually collects additional image data of the room 500, which is also transmitted to the controller 306 to be compared with the initial image data. It should be understood that additional image data is continually captured throughout the method 700 and analyzed to determine whether a potentially hazardous object is present and for how long the potentially hazardous object is present.

At step 706, the object detection module 402 analyzes the image data collected by the image capture device 216 by comparing the initial image data, in which it is determined that no object is detected, with the additional image data. Any newly identified object within the additional image data that is not present in the initial image data is further analyzed by the AI analysis module 404 to determine whether that object should be classified as a potential hazard. In embodiments, the AI analysis module 404 uses a machine learning algorithm to determine whether an object should be classified as a potential hazard. The AI analysis module 404 may be trained by an operator in real time by confirming or declining that a detected object is in fact a potential hazard.

At step 708, once the AI analysis module 404 determines that an object should be classified as a potential hazard, the hazard notification module 406 sends instruction to initiate a hazard notification. The hazard notification may take the form of an audible and/or visual alert within the room 500, an alert being sent to the central monitoring station 302, a projection beam being emitted onto the potentially hazardous object and the like, or any combination thereof. For example, at step 710, the hazard notification module 406 sends a signal to the alarm device 116 to emit an audible alarm and/or display a visual alarm. In embodiments, the audible alarm may last only a predetermined length of time. In other embodiments, the audible alarm may last until the alarm device 116 is manually deactivated or the object detection module 402 determines that the object classified as a potential hazard is no longer present. In embodiments, the alarm device 116 may, separate from or in combination with the audible alarm, may display a visual alarm such as flashing colors or text displaying the nature of the potential hazard, e.g., the location of the potential hazard. At step 712, the hazard notification module 406 transmits an alert to the central monitoring station 302. This informs appropriate personnel of a potential hazard present within the room 500 so that appropriate steps may be performed to remediate the potential hazard such as, for example, cleaning up a spill.

At step 714, the image projection device 218 is operated to emit a projection beam toward the mirrored dome 204 and specifically toward a reflection of the object reflected by the outer surface 206 of the mirrored dome 204. As discussed herein, the image projection device 218 may emit a projection beam 516 toward the mirrored dome 204 such that the projection beam 516 is reflected onto the floor surface 501 of the room 500 so as to indicate the presence of the object 514 classified as a potential hazard. In embodiments, the projection beam 516 defines the hazard icon 517 to overlay and/or surround the object 514 to draw attention to the object 514. In embodiments, the projection beam 516 emitted by the image projection device 218 is static in its luminosity and position such that it does not change over time. In other embodiments, the image projection device 218 may be operated such that the projection beam 516 alters the appearance of the hazard icon 517 over time. For example, the projection beam 516 may alternate between increasing and decreasing brightness. As another non-limiting example, the position of the projection beam 516 may be changed to alter a position or size of the hazard icon 517. Any changes in the display of the projection beam 516 may increase over time to result in increased attention being drawn to the object 514.

It should be appreciated that the various examples discussed herein for hazard notifications performed in steps 710-714 may be performed either alone or in combination with one another in no particular sequence. For example, the alarm device 116 may be operated simultaneously with the projection beam 516 being displayed.

At step 716, the controller 306 determines whether a stop condition has been satisfied. A non-limiting example of a stop condition being satisfied may include an operator sending instruction to the person support apparatus 100, such as through the central monitoring station 302, indicating that the potentially hazardous object has been remediated, e.g., cleaned or removed. Another non-limiting example of a stop condition being satisfied is the object detection module 402 determining that the potentially hazardous object is no longer present within the room 500. It should be appreciated that other stop conditions are contemplated as being within the scope of the present disclosure.

If the stop condition has been satisfied, at step 718, the hazard notification module 406 discontinues the hazard notification. For example, once the stop condition is satisfied, the alarm device 116, if operated, may be deactivated, a second alert may be sent to the central monitoring station 302 indicating that the potential hazard has been remediated, such as the object 514 being removed from the room 500, and/or the image projection device 218 may be deactivated such that the projection beam 516 is no longer emitted. Further, at step 720, the data collection module 410 proceeds to send hazard data to the central monitoring station 302 indicating details of the potential hazard present within the room 500. For example, the hazard data transmitted to the central monitoring station 302 may include a particular location of the room 500 in which the potential hazard was present, a length of time the potential hazard was present, the type of potential hazard, and the like. This information may be utilized to determine which rooms require more attention based on the frequency of potential hazards in those rooms and/or the length of time the potential hazards are present.

Alternatively, if the stop condition is not satisfied at step 716, a further determination is made by the object detection module 402 based on image data captured by the image capture device 216 as to whether a person, such as the person 518, is present in the room 500 at step 722. If the person 518 is not present in the room 500, the method 700 returns to step 716 to determine if the stop condition is satisfied. As such, the hazard notification continues until the stop condition is eventually satisfied. Alternatively, if it is determined that the person 518 is present within the room 500, a further determination is made to identify a location of the person support apparatus 100 within the room 500. As discussed herein, the person support apparatus 100 may include the location sensor 316 configured to capture location data indicating a location of the person support apparatus 100. In addition, in embodiments, the image data captured by the image capture device 216 may include the presence of one or more location indicators 508 placed around the room 500, such as on walls 510, 512 of the room 500 or items 506. The image data including the presence of the location indicators 508, along with the location data capture by the location sensor 316, may be sent to the location detection module 400 to determine the particular location and specific orientation, of the person support apparatus 100 within the room 500.

Based on a known location of various room features, such as the door 502 and the bathroom 504, relative to the person support apparatus 100 stored within the location detection module 400, the location and orientation of the person support apparatus 100 may be determined at step 724. Specifically, the location of the person support apparatus 100 may be determined by capturing image data of the location indicators 508 and transmitting the image data to the controller 306, and specifically the location detection module 400, which determines a location of the person support apparatus 100. As such, the path planning module 408 is capable of determining a path to and from the person support apparatus 100, the door 502, and the bathroom 504 based on a detected location of the person 518. For example, the path planning module 408 may determine a path between the person 518 and the person support apparatus 100 if the object detection module 402 determines that the person 518 is near the door 502. As another non-limiting example, the path planning module 408 may determine a path between the person 518 and the bathroom 504 or the door 502 if the object detection module 402 determines that the person 518 is near the person support apparatus 100 and walking toward the bathroom 504 or the door 502. It should be appreciated that the paths determined by the path planning module 408 take into consideration the known location of the object 514 classified as a potential hazard so that the person 518 avoids the object 514 while walking to the intended destination.

Once the path planning module 408 determines an appropriate path for the person 518, the path planning module 408 sends a signal to the image projection device 218 at step 726 to project the path on the floor surface 501 of the room 500. For example, as depicted in FIG. 6, the image projection device 218 projects a path 604 including a plurality of arrows 602 depicting a walking direction for the person 518 to follow from the door 502 to the person support apparatus 100, while avoiding the object 514. The path 604 is continuously displayed and the method 700 returns to step 722 to confirm by the object detection module 402 that the person 518 is still present in the room 500. If the object detection module 402 determines that the person 518 is no longer present in the room 500, the method 700 returns to step 716 and repeats until the stop condition is satisfied.

Figure 8:
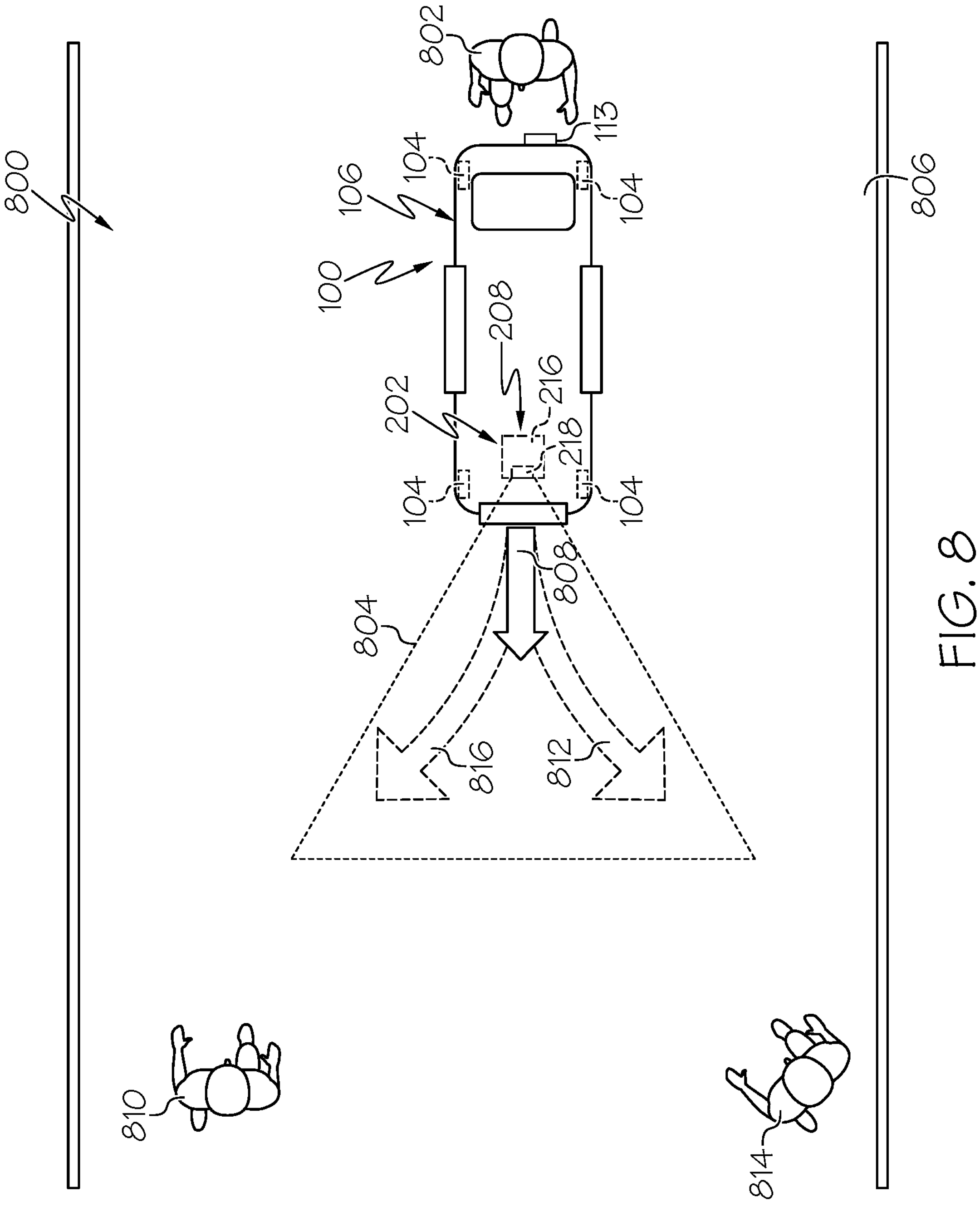
FIG. 8 schematically depicts a plan view of a hallway including the person support apparatus of FIG. 1 in which a projection beam is emitted to project a moving path of the person support apparatus, according to one or more embodiments shown and described herein.

Referring now to FIG. 8, the person support apparatus 100 is depicted moving down a hallway 800. As discussed herein, the person support apparatus 100 may be an autonomously driven vehicle moving to a target destination in response to receiving navigation instructions. In other embodiments, the person support apparatus 100 may be maneuvered by an operator 802, as depicted in FIG. 8, pushing the person support apparatus 100 down the hallway 800. As the person support apparatus 100 is moving through the hallway 800, the image projection device 218 may be operated to emit a projection beam 804 onto a floor surface 806 of the hallway 800 in front of the person support apparatus 100. The projection beam 804 may define an arrow 808 indicating a moving direction of the person support apparatus 100 as determined based on moving data transmitted to the controller 306. In embodiments, the drive mechanism 113 may determine a moving direction of the casters 104 and/or a rotational speed of the casters 104. In other embodiments, the moving data may be collected based on the image capture device 216 detecting a moving speed of the floor surface 806 to the person support apparatus 100 and/or using environmental references. As discussed in more detail herein, the image projection device 218 adjusts the appearance of the arrow 808 based one or more factors such as, for example, a moving direction and/or rotational speed of the casters 104, the presence of an incoming obstacle, and the like.

While the person support apparatus 100 is in motion, the image capture device 216 is operated to capture image data in front of the person support apparatus 100. The captured image data is transmitted to the object detection module 402 to determine whether an obstacle, such as a person or another person support apparatus, is within a moving path of the person support apparatus 100 such that the obstacle should be informed of the moving direction and speed of the person support apparatus 100. In embodiments, as shown in FIG. 8, a first obstacle 810 may be detected by the object detection module 402 in front of the person support apparatus 100 based on image data captured by the image capture device 216. In response to detecting the first obstacle 810, which the object detection module 402 determines to be a non-moving obstacle, such as a person standing still, the path planning module 408 determines a path that the person support apparatus 100 should take to avoid the first obstacle 810. Once the path is determined, a signal is transmitted to the image projection device 218 to adjust the arrow 808 projected onto the floor surface 806 of the hallway 800.

As shown in FIG. 8, the arrow 808 may be adjusted to define an adjusted arrow 812. As shown, the adjusted arrow 812 is directed away from the first obstacle 810. In addition, a length of the adjusted arrow 812 may be increased as compared to a length of the arrow 808 based on a moving speed of the person support apparatus 100. For example, as shown, the length of the adjusted arrow 812 is greater than the length of the arrow 808 to indicate that the moving speed of the person support apparatus 100 is increasing or moving at a first speed, as determined by the drive mechanism 113. In addition, a position of the adjusted arrow 812 relative to the person support apparatus 100 may be moved further from the person support apparatus 100 to indicate that the moving speed of the person support apparatus 100 is increasing or moving at the first speed. Alternatively, it should be appreciated that the length of the adjusted arrow 812 may be decreased to indicate that the moving speed of the person support apparatus 100 is decreasing or moving at a second speed less than the first speed, as determined by the drive mechanism 113. In addition, a position of the adjusted arrow 812 relative to the person support apparatus 100 may be moved closer to the person support apparatus 100 to indicate that the moving speed of the person support apparatus 100 is decreasing or moving at the second speed. It should also be appreciated that the direction of the adjusted arrow 812 may be controlled based on a moving direction of the person support apparatus 100, as determined by the drive mechanism 113. Similarly, in response to detecting a second obstacle 814 positioned on an opposite side of the hallway 800 in front of the person support apparatus 100, an adjusted arrow 816 may be projected by the image projection device 218 indicating a moving direction of the person support apparatus 100 opposite that depicted by the adjusted arrow 812 in response to detecting the first obstacle 810.

Figure 9:
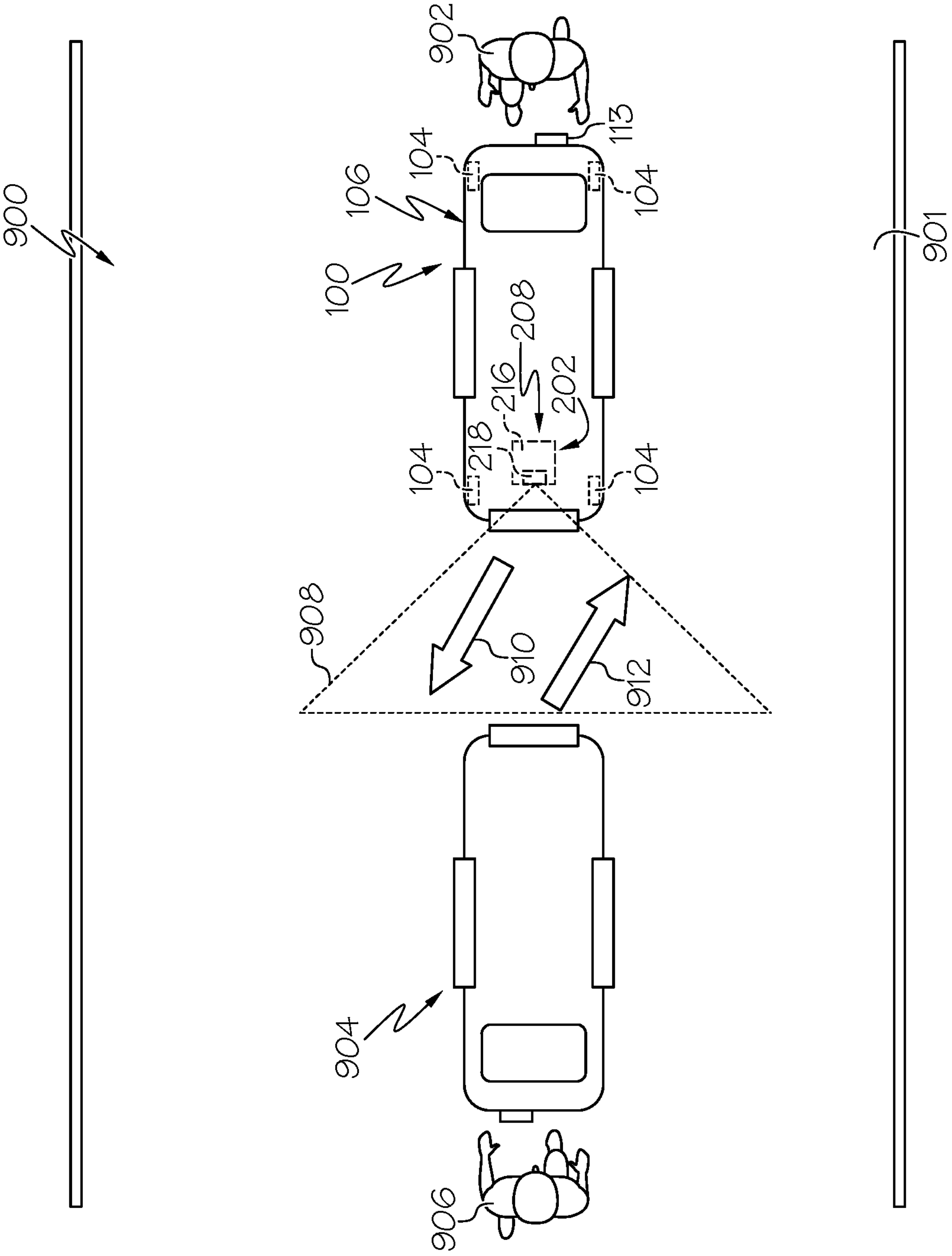
FIG. 9 schematically depicts a plan view of a hallway including the person support apparatus of FIG. 1 in which a projection beam is emitted to project a moving path of the person support apparatus and a moving path of a moving obstacle, according to one or more embodiments shown and described herein.

Referring now to FIG. 9, the person support apparatus 100 is depicted as moving down a hallway 900 with an operator 902 positioned at a rear of the person support apparatus 100 to monitor or control movement of the person support apparatus 100. In addition, a moving obstacle 904 and an operator 906 positioned at the rear of the moving obstacle 904 are depicted as moving down the hallway 900 toward the person support apparatus 100. As shown in FIG. 9, the moving obstacle 904 is depicted as a person support apparatus. However, it should be appreciated that the moving obstacle 904 may be any type of moving device such as, for example, a patient transport bed, wheelchair, and the like. In embodiments, the image capture device 216 captures image data surrounding the person support apparatus 100, as discussed herein, and the image data is transmitted to the object detection module 402, which determines whether an object, or in this case, the moving obstacle 904, is present and within a moving path of the person support apparatus 100. In embodiments, the AI analysis module 404 assists in determining whether the object detected by the object detection module 402 is moving or not moving. In response to the object detection module 402 and the AI analysis module 404 determining that the detected object is a moving obstacle, such as the moving obstacle 904, a signal is sent to the path planning module 408 to determine a path for each of the person support apparatus 100 and the moving obstacle 904 so that a collision is avoided.

Once a path for the person support apparatus 100 and a path for the moving obstacle 904 are determined, a signal is transmitted to the image projection device 218 to project the arrows indicating the paths. As shown in FIG. 9, the image projection device 218 of the person support apparatus 100 emits a projection beam 908 onto a floor surface 901 of the hallway 900, which defines a first arrow 910 indicating the path for the person support apparatus 100 determined by the path planning module 408 and defines a second arrow 912 indicating the path for the moving obstacle determined by the path planning module 408. By projecting the first arrow 910 and the second arrow 912 onto the floor surface 901 of the hallway 900, the operator 902 of the person support apparatus 100 and the operator 906 of the moving obstacle 904 are notified as to how the person support apparatus 100 and the moving obstacle 904 should be respectively maneuvered to avoid a collision. By designating a path for each, this reduces the likelihood that the person support apparatus 100 and the moving obstacle 904 will each attempt to move in the same direction to avoid a collision with one another.

Figure 10:
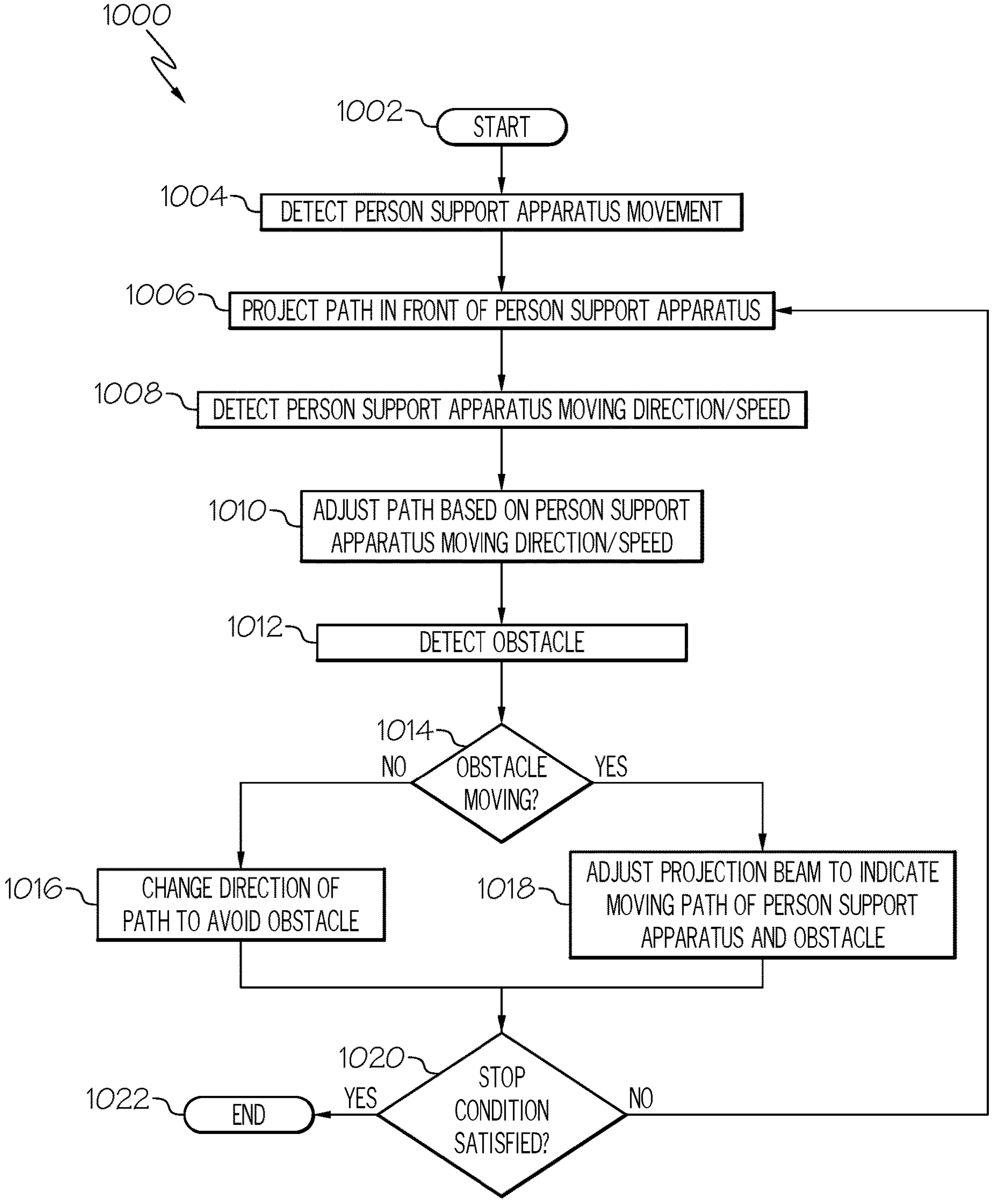
FIG. 10 depicts a flowchart of a method for emitting a projection beam to project a moving path of the person support apparatus of FIG. 1, according to one or more embodiments shown and described herein.

FIG. 10 depicts a method 1000 for emitting a path identifying an intended moving direction of a person support apparatus to avoid a collision. The method 1000 is described herein with reference to FIGS. 1-4, 8, and 9.

Initially, at step 1002, the method 1000 starts by activating the imaging device 208 and the drive mechanism 113 of the person support apparatus 100. At step 1004, moving data of the person support apparatus 100 is collected to determine whether the person support apparatus 100 is moving. As described herein, the moving data may be collected by the drive mechanism 113 and/or the image capture device 216.

At step 1006, as depicted in FIG. 8, the image projection device 218 is operated to emit a projection beam, such as projection beam 804, onto the floor surface 806 of the hallway 800. The projection beam 804 defines an arrow, such as arrow 808, which indicates a moving direction of the person support apparatus 100.

At step 1008, in some embodiments, the drive mechanism 113 may determine at what speed and direction the person support apparatus 100 is moving by monitoring the casters 104 of the person support apparatus 100. Moving data collected by the drive mechanism 113 indicating a moving speed and/or a moving direction of the person support apparatus 100 may be transmitted to the controller 306.

At step 1010, the image projection device 218 may adjust the display of the arrow 808 based on the moving data collected by the drive mechanism 113. For example, an adjusted arrow, such as the adjusted arrow 812 or the adjusted arrow 816, may be projected by the image projection device 218 to indicate that the person support apparatus 100 is turning, or will turn. Further, a length of the adjusted arrow, such as the adjusted arrow 812 or the adjusted arrow 816, may be increased or decreased by the image projection device 218 to indicate that a speed of the person support apparatus 100 is increasing or decreasing.

At step 1012, the image capture device 216 is continuously operated to capture image data in front of and surrounding the person support apparatus 100 to identify whether an obstacle is present that may interfere with the movement of the person support apparatus 100. Specifically, the image capture device 216 transmits the collected image data to the object detection module 402, which analyzes the collected image data, alone or in combination with the AI analysis module 404, to determine whether an obstacle is present within the moving path of the person support apparatus 100. Moreover, at step 1014, the object detection module 402 further analyzes the collected image data transmitted from the image capture device 216, alone or in combination with the AI analysis module 404, to determine whether the detected obstacle is moving or not moving. If it is determined that the obstacle is not moving, an adjusted arrow may be projected at step 1016 by the image projection device 218 to define a modified path of the person support apparatus 100 to avoid the obstacle. For example, as depicted in FIG. 8, if the first obstacle 810 is detected, an adjusted arrow 812 pointing in a first direction may be projected indicating an actual or intended moving direction of the person support apparatus 100 away from the first obstacle 810. Alternatively, as depicted in FIG. 8, if the second obstacle 814 is detected, an adjusted arrow 816 pointing in a second direction different from the first direction may be projected indicating an actual or intended moving direction of the person support apparatus 100 away from the second obstacle 814.

Alternatively, if it is determined that the obstacle is moving, the method 1000 proceeds to step 1018. At step 1018, the projection beam emitted by the image projection device 218 is adjusted to define an arrow indicating a moving direction of the person support apparatus 100 and an arrow indicating a moving direction of the moving obstacle. For example, as depicted in FIG. 9, a first arrow 910 is defined by the projection beam 908 emitted by the image projection device 218 to indicate a moving path of the person support apparatus 100 and a second arrow 912 is defined by the projection beam 908 to indicate a moving path of the moving obstacle 904. Accordingly, the person support apparatus 100 may be maneuvered by the operator 902 and the moving obstacle 904 may be maneuvered by the operator 906 to follow the path of the first arrow 910 and the second arrow 912, respectively, so avoid a collision with one another.

The first arrow 910 and the second arrow 912 may be projected until it is determined at step 1020 that a stop condition is satisfied. A non-limiting example of a stop condition being satisfied is the object detection module 402 determining that the obstacle, such as obstacles 810, 814, 906, are no longer present within a moving direction of the person support apparatus 100 based on the analyzed image data captured by the image capture device 216. Another non-limiting example of a stop condition being satisfied is the image projection device 218 receiving instruction to be deactivated. This instruction may be sent from an operator 802, 902 of the person support apparatus 100. In response determining that a stop condition is satisfied at step 1020, the method 1000 proceeds to step 1022 at which the projection beam is no longer emitted from the image projection device 218. In instances in which it is not determined that a stop condition is satisfied at step 1020, then the method 1000 proceeds back to step 1006.

Figure 11:
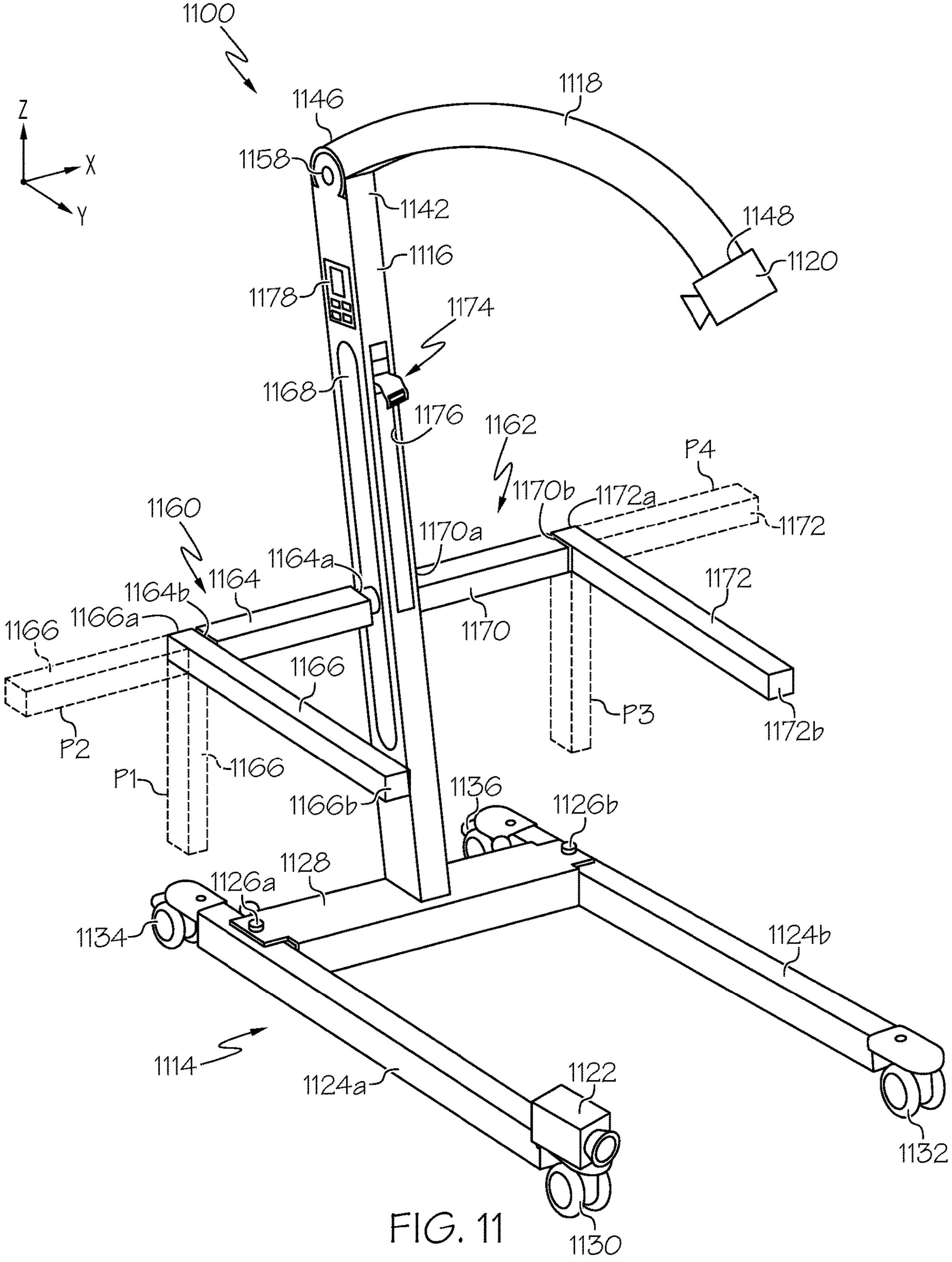
FIG. 11 schematically depicts a perspective view of another embodiment of a person support apparatus, according to one or more embodiments shown and described herein.

As described herein, the person support apparatus 100 may be a hospital bed, a stretcher, a subject lift, a chair, an operating table, or similar support apparatuses commonly found in care facilities such as hospitals, nursing homes, rehabilitation centers, or the like. As such, the person support apparatus 100 is depicted as a hospital bed in FIG. 1. Referring now to FIG. 11, a person support apparatus 1100 is depicted as a walking device. As described herein, the person support apparatus 1100 may be utilized to provide support a person during a walking exercise or routine, guide a person supported by the person support apparatus 1100 along a walking or moving path, and/or detect a walking pattern of the person. In detecting the walking pattern of the person, corrective measures may be taken in response to detecting that the person may be falling and/or collect walking data of the person utilized for developing treatment and treatment purposes.

The person support apparatus 1100 includes a base 1114, a mast 1116 extending upwardly from the base 1114, a neck 1118 pivotally coupled to the mast 1116, and a pair of arms 1160, 1162 extending in opposite directions from the mast 1116.

With respect to the embodiment of the person support apparatus 1100 disclosed herein, the base 1114 may include a pair of base legs **1124*a*, 1124*b* which are pivotally coupled to a cross support 1128 at a pair of base leg pivots 1126*a*, 1126*b* such that the base legs 1124*a*, 1124*b* may be pivotally adjusted with respect to the mast 1116. The base legs 1124*a*, 1124*b* may additionally include a pair of front casters 1130, 1132 and a pair of rear casters 1134, 1136. The rear casters 1134, 1136** may include castor brakes (not shown).

In embodiments, the mast 1116 is fixedly coupled to the base 1114. In other embodiments, the mast 1116 may be movably coupled to the base 1114 such that the mast 1116 may be raised and lowered relative to the base 1114 to increase a height of the person support apparatus 1100. Accordingly, it will be understood that the position of the mast 1116 may be adjusted vertically (e.g., in the Z direction on the coordinate axes shown in FIG. 11) with respect to the base 1114 by repositioning the mast 1116 within the base 1114.

The neck 1118 has a first end 1146 and a second end 1148 opposite the first end. In embodiments, the first end 1146 of the neck 1118 is fixed to an upper end 1142 of the mast 1116 such that the neck 1118 does not rotate relative to the mast 1116. In other embodiments, the first end 1146 of the neck

1118 is pivotally coupled to the upper end 1142 of the mast 1116 at a neck pivot 1158 such that the neck 1118 may be pivoted (e.g., the second end 1148 of the neck 1118 is raised and lowered) with respect to the base 1114.

The person support apparatus 1100 includes a person image capture device 1120 provided at the second end 1148 of the neck 1118, and an obstacle image capture device 1122 provided at an end of one of the base legs 1124*a*, 1124*b* opposite the mast 1116. The person image capture device 1120 has a field of view directed toward the base 1114 and the mast 1116 so as to capture image data of a person utilizing the person support apparatus 1100. However, the person image capture device 1120 may be provided at any suitable location so as to capture an image of the person utilizing the person support apparatus 1100. The obstacle image capture device 1122 is directed away from the mast 1116 so as to capture an image of a potential obstacle in a moving path of the person support apparatus 1100. However, the obstacle image capture device 1122 may be provided at any suitable location so as to capture an image of the potential obstacle in the moving path of the person support apparatus 1100. The person image capture device 1120 and the obstacle image capture device 1122 may each be similar to the image capture device 216 depicted in FIG. 5 and described herein. For example, the person image capture device 1120 and the obstacle image capture device 1122 may each include one or more optical components, such as a mirror, fish-eye lens, or any other type of lens. In some embodiments, the person image capture device 1120 and the obstacle image capture device 1122 each include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein could include one or more LIDAR sensors, radar sensors, sonar sensors, or other types of sensors and that such data could be integrated into or supplement the data collection described herein. Additionally, in embodiments, the person image capture device 1120 and/or the obstacle image capture device 1122 may include an image projection device such as, for example, the image projection device 218 described herein and depicted in FIG. 2.

Additionally, the person support apparatus includes a first arm 1160 and a second arm 1162 extending from the mast 1116. Each arm 1160, 1162 includes a first arm segment and a second arm segment. With respect to the first arm 1160, the first arm segment 1164 has a first end 1164*a* extending from a first side of the mast 1116 and a second end 1164*b* opposite the first end 1164*a*. The second arm segment 1166 of the first arm 1160 has a first end 1166*a* rotatably coupled to the second end 1164*b* of the first arm segment 1164, and a second end 1166*b* opposite the first end 1166*a*. The first arm segment 1164 is received within an arm track 1168 formed in the mast 1116 and is permitted to be adjusted vertically (e.g., in the Z direction on the coordinate axes shown in FIG. 11) with respect to the base 1114. Additionally, the second arm segment 1166 is permitted to rotate relative to the first arm segment 1164 from a closed position, as denoted by solid lines, to either a lowered position P1 or an open position P2, as denoted by dashed lines. In the lowered position P1, the second arm segment 1166 is rotated to be parallel to the mast 1116. In the open position P2, the second arm segment 1166 is rotated to be parallel to the first arm segment 1164.

The second arm 1162 has similar structure to the first arm 1160. As such, the first arm segment 1170 of the second arm 1162 has a first end 1170*a* extending from a second side of the mast 1116 and a second end 1170*b* opposite the first end 1170*a*. The second arm segment 1172 of the second arm 1162 has a first end 1172*a* rotatably coupled to the second end 1170*b* of the first arm segment 1170, and a second end 1172*b* opposite the first end 1172*a*. The first arm segment 1170 is received within an arm track, similar to the arm track 1168, formed in the mast 1116 and is permitted to be adjusted vertically (e.g., in the Z direction on the coordinate axes shown in FIG. 11) with respect to the base 1114. Additionally, the second arm segment 1172 is permitted to rotate relative to the first arm segment 1170 from a closed position, as denoted by solid lines, to either a lowered position P3 or an open position P4, as denoted by dashed lines. In the lowered position P3, the second arm segment 1172 is rotated to be parallel to the mast 1116. In the open position P4, the second arm segment 1172 is rotated to be parallel to the first arm segment 1170.

The arm tracks 1168 may include any suitable components for moving the first arm and the second arm vertically such as, for example, a worm gear, an actuator, a motor, a rack and pinion, and the like, or a combination thereof. In embodiments, the arm track 1168 formed in the mast 1116 from which the first arm 1160 extends may be the same arm track from which the second arm 1162 extends such that the first arm 1160 and the second arm 1162 move vertically in unison with one another. In other embodiments, the arm tracks 1168 may include separate arm track components such that the first arm 1160 and the second arm 1162 move vertically independent of one another.

The person support apparatus 1100 further includes a tether assembly 1174 slidably movable within the mast 1116, as described in more detail herein. The tether assembly 1174 is mounted within a tether track 1176 formed in the mast 1116, which permits the tether assembly 1174 to be adjusted vertically (e.g., in the Z direction on the coordinate axes shown in FIG. 11) with respect to the base 1114. The tether track 1176 may include any suitable components for moving the tether assembly 1174 such as, for example, a worm gear, an actuator, a motor, a rack and pinion, and the like, or a combination thereof. In embodiments, the tether track 1176 formed in the mast 1116 from which the tether assembly 1174 extends may be the integrally formed with the arm tracks 1168 such that the tether assembly 1174 moves in unison with the first arm 1160 and the second arm 1162 described herein. In other embodiments, the tether track 1176 may be separate from the arm tracks 1168 such that the tether assembly 1174 moves vertically independent of the first arm 1160 and the second arm 1162.

In embodiments, the person support apparatus 1100 includes a user interface 1178 for controlling various components of the person support apparatus 1100. As shown in FIG. 11, the user interface 1178 is provided on the mast 1116. However, it should be appreciated that the user interface 1178 may be provided at any suitable location of the person support apparatus 1100. Additionally, in embodiments, the user interface 1178 may be a separate device communicatively coupled to the person support apparatus 1100 via any suitable wires or, alternatively, wirelessly coupled to the person support apparatus 1100. The user interface 1178 may be utilized for positioning the first arm 1160 and/or the second arm 1162, the tether assembly 1174, or providing a set of instructions for performing a walking routine. As such, the user interface 1178 may include any suitable input device such as, for example, buttons, knobs, or a touchpad, for inputting the instructions. The user interface 1178 may also include a display screen for displaying a status of the person support apparatus 1100 such as, for example, data pertaining to a previous walking routine, a future walking routine, and the like.

Figure 12:
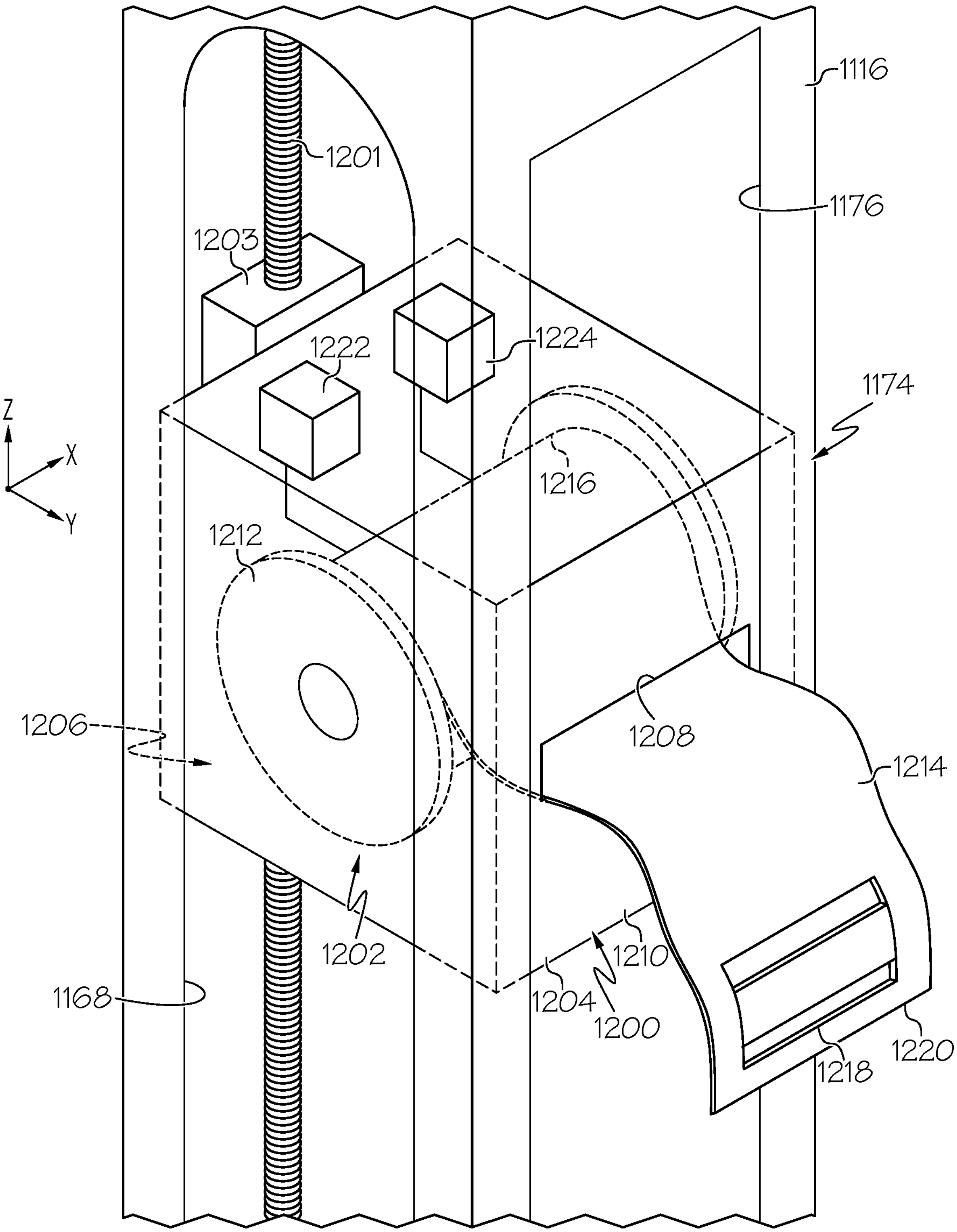
FIG. 12 schematically depicts a perspective view of a tether assembly of the person support apparatus of FIG. 11 in a walking state, according to one or more embodiments shown and described herein.

Referring now to FIG. 12, an enlarged view of the tether assembly 1174 is depicted within the mast 1116. As shown, the tether assembly 1174 is provided within the tether track 1176. As described herein, the tether track 1176 may include any suitable mechanism for moving the tether assembly 1174 in the vertical direction. For example, as shown, the tether track 1176 includes a rod 1201 having external threads extending within the mast 1116 and a plate 1203 having internal threads mounted to the tether assembly 1174. The rod is rotatably fixed at opposite tends to the mast 1116. The plate 1203 is fixed to the tether assembly 1174 within the mast 1116 to prohibit rotation relative to mast 1116, but permit rotation relative to the rod 1201. Accordingly, as the rod 1201 rotates in a first rotation direction, such as by a motor or the like, the plate 1203 translates in a first vertical direction. As the plate 1203 is fixed to the tether assembly 1174, vertical movement of the plate 1203 in the first vertical direction results in vertical movement of the tether assembly 1174 in the first vertical direction. Alternatively, as the rod 1201 rotates in a second rotation direction opposite the first rotation direction, the plate 1203 translates in a second vertical direction opposite the first vertical direction. As the plate 1203 is fixed to the tether assembly 1174, vertical movement of the plate 1203 in the second vertical direction results in vertical movement of the tether assembly 1174 in the second vertical direction. As described herein, the tether assembly 1174 may be adjusted to account for a height of the person utilizing the person support apparatus 1100.

Referring still to FIG. 12, the tether assembly 1174 is shown generally including a housing 1200 and a spool 1202 provided within the housing 1200. The housing 1200 includes one or more walls 1204 that define an open interior 1206 in which the spool 1202 is provided. A slot 1208 is formed in a front wall 1210 of the one or more walls 1204 of the housing 1200. The spool 1202 is rotatably fixed within the open interior 1206 of the housing 1200. The spool 1202 includes a roller 1212 and a tether 1214 at least partially wrapped or wound around the roller 1212. The tether 1214 is fixed to the roller 1212 at a first end 1216 thereof and the tether 1214 is fed through the slot 1208 formed in the front wall 1210 of the housing 1200 to be accessible from outside of the mast 1116 (FIG. 11). The tether 1214 includes an attachment mechanism 1218 provided at a second end 1220 of the tether 1214 which is accessible from outside of the mast 1116. As described herein, the attachment mechanism 1218 is utilized for securing to a wearable device such as, for example, a harness, a vest, a sling, or the like worn by a person. The attachment mechanism 1218 may include any suitable mechanism such as, for example, a buckle, a clip, a snap, or the like. In embodiments, a receptacle such as, for example, a harness, basket, seat, or the like, may be provided on the person support apparatus 1100 and the person may be received within the receptacle such as by extending their legs through the receptacle so as to be supported by the person support apparatus 1100.

In embodiments, the tether assembly 1174 further includes a motor 1222 for controlling rotation of the roller 1212. Accordingly, the motor 1222 may be operated to prohibit rotation of the roller 1212 in one or both directions or permit free and/or controlled rotation of the roller 1212. As such, the roller 1212 may be operated by the motor 1222 to roll in a first rotation direction to allow additional slack of the tether 1214 to be fed through the slot 1208, and to roller 1212 in a second rotation direction opposite the first rotation direction to draw the tether 1214 back into the mast 1116 through the slot 1208 to reduce the amount of slack.

In embodiments, the tether assembly 1174 further includes a tension sensor 1224 for detecting an amount of tension provided on the tether 1214 in a direction opposite the roller 1212. Specifically, the tension sensor 1224 detects an amount of tension by applied on the motor 1222 at the attachment mechanism 1218 of the tether 1214. In other embodiments, the tension sensor 1224 may detect an amount of rotational force applied onto the roller 1212. The tension sensor 1224 may be any suitable device such as, for example, a load cell, a force sensor, force transducer, or the like. As described herein, increased tension applied onto the motor 1222 may be indicative of the person dropping to the ground during a fall event. The tension sensor 1224 may be communicatively coupled to the motor 1222 such that the motor 1222 may be utilized to perform a corrective action in situations in which a fall event is detected. For example, when the tension sensor 1224 detects increased tension that is indicative of a fall event, the motor 1222 may prohibit rotation of the roller 1212 such that additional slack of the tether 1214 is not permitted, thereby preventing the person from falling further.

Figure 13:
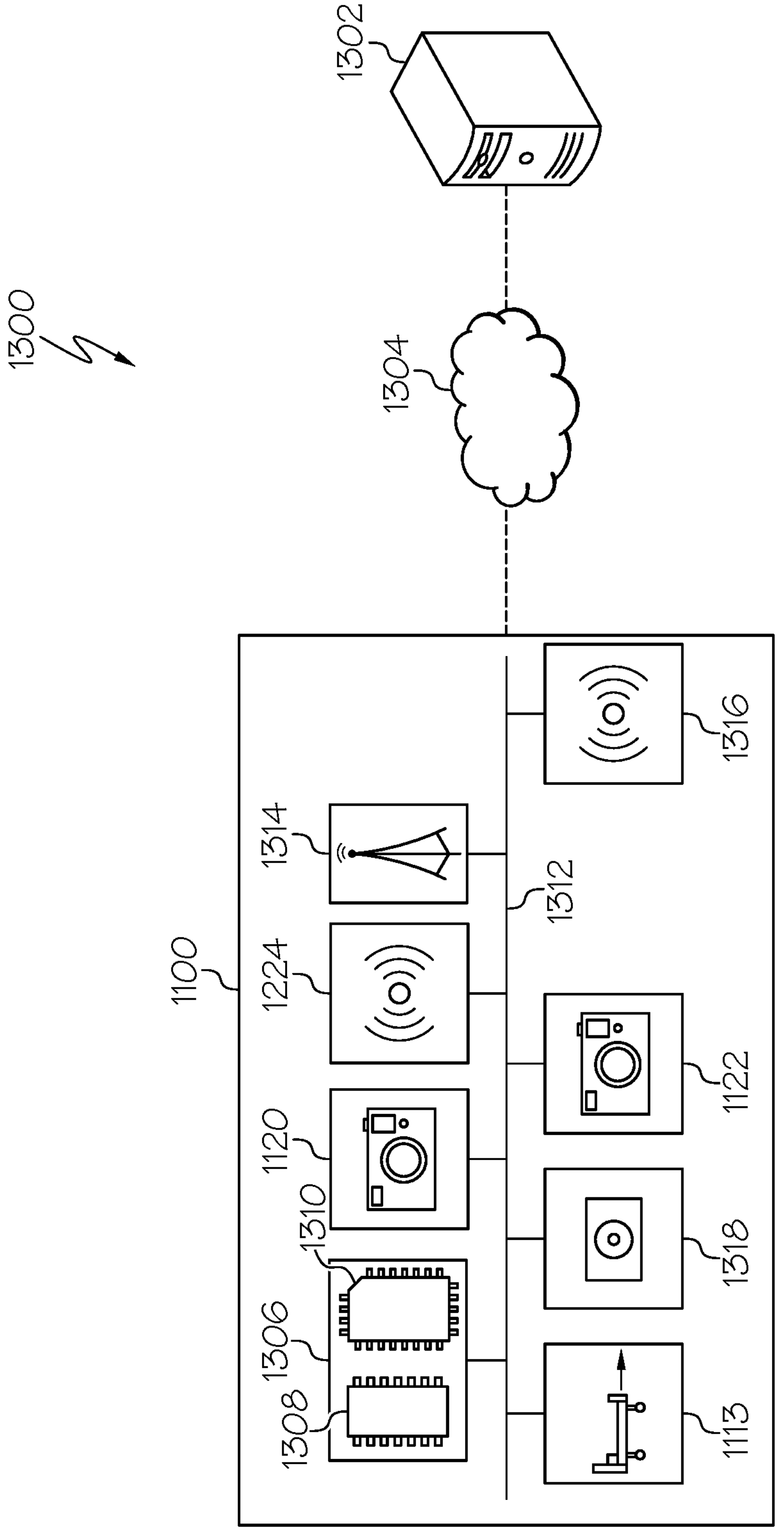
FIG. 13 schematically depicts components of a system including the person support apparatus of FIG. 11, according to one or more embodiments shown and described herein.

Referring now to FIG. 13, a system 1300 is illustrated according to one or more embodiments described herein. The system 1300 is depicted as generally including the person support apparatus 1100 configured to communicate with a central monitoring station 1302 via a network 1304. It should be appreciated that the central monitoring station 1302 and the network 1304 are similar to the central monitoring station 302 and the network 304, respectively. As such, the central monitoring station 1302 and the network 1304 will not be described in detail herein.

The person support apparatus 1100 further includes a controller 1306 including one or more processors 1308 and one or more memory modules 1310. Each of the one or more processors 1308 may be any device capable of executing machine readable and executable instructions. The one or more processors 1308 are coupled to a communication path 1312 that provides signal interconnectivity between various modules of the system 1300. The person support apparatus 1100 includes network interface hardware 1314 for communicatively coupling the person support apparatus 1100 to the central monitoring station 1302. The network interface hardware 1314 can be communicatively coupled to the communication path 1312 and can be any device capable of receiving and transmitting data via the network 1304. The controller 1306, the processors 1308, the memory modules 1310, the network interface hardware 1314, and the communication path 1312 are similar to the controller 306, the processors 308, the memory modules 310, the network interface hardware 314, and the communication path 312, respectively. As such, the controller 1306, the processor 1308, the memory modules 1310, the network interface hardware 1314, and the communication path 1312 will not be described in detail herein.

As described herein, the person support apparatus 1100 may be a passively movable device such that the person support apparatus 1100 only moves upon being pulled and/or pushed by a person. However, in embodiments, the person support apparatus 1100 includes a drive mechanism 1113 for controlling rotation of the casters 1130, 1132, 1134, 1136. The drive mechanism 1113 is similar to the drive mechanism 113. Accordingly, the drive mechanism 1113 will not be described in detail herein. In embodiments, the person support apparatus 1100 further includes an alarm device 1318, such as the alarm device 116, and a location sensor 1316, such as the location sensor 316. Accordingly, the alarm device 1318 and the location sensor 1316 will not be described in more detail herein.

Figure 14:
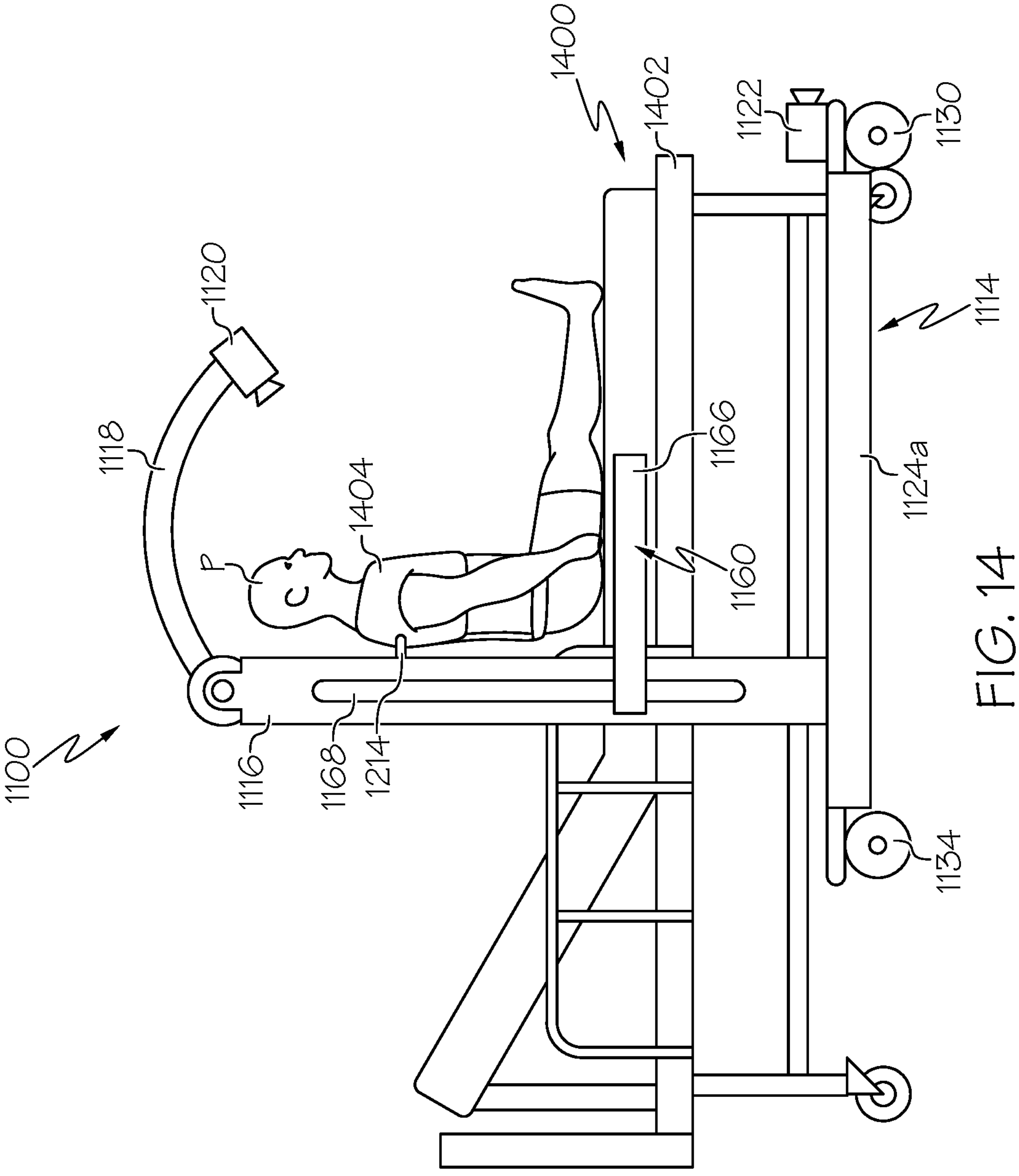
FIG. 14 schematically depicts a side view of the person support apparatus of FIG. 11 in a receiving state and positioned against a bed for receiving a person, according to one or more embodiments shown and described herein.

Referring now to FIG. 14, the person support apparatus 1100 is shown in a receiving state and positioned against a bed 1400 so as to permit a person P to get off the bed 1400 and positioning themselves within the person support apparatus 1100. Specifically, in the receiving state, the first arm 1160 is lowered within the mast 1116 relative to the base 1114 via the arm track 1168. Additionally, although not shown in FIG. 14, the second arm 1162 remains in the same vertical position as shown in FIG. 11 and is moved into the open position P3 so as to extend behind the person P on the bed 1400. In other embodiments, the second arm 1162 may be lowered so as to be below a mattress 1402 of the bed 1400. In either instance, this allows the mast 1116 of the person support apparatus 1100 to be pushed up against the bed 1400 and closer to the person P. As shown in FIG. 14, the person P is wearing a harness 1404, which is coupled to the tether 1214, specifically, the attachment mechanism 1218 of the tether 1214 so as to secure the person P to the person support apparatus 1100. With the person support apparatus 1100 in the receiving state, the obstacle image capture device 1122 detects whether an obstacle 1600 is present within the moving path. As described herein, if the obstacle 1600 is detected, the person support apparatus 1100 performs an avoidance maneuver to avoid the obstacle 1600.

Figure 15:
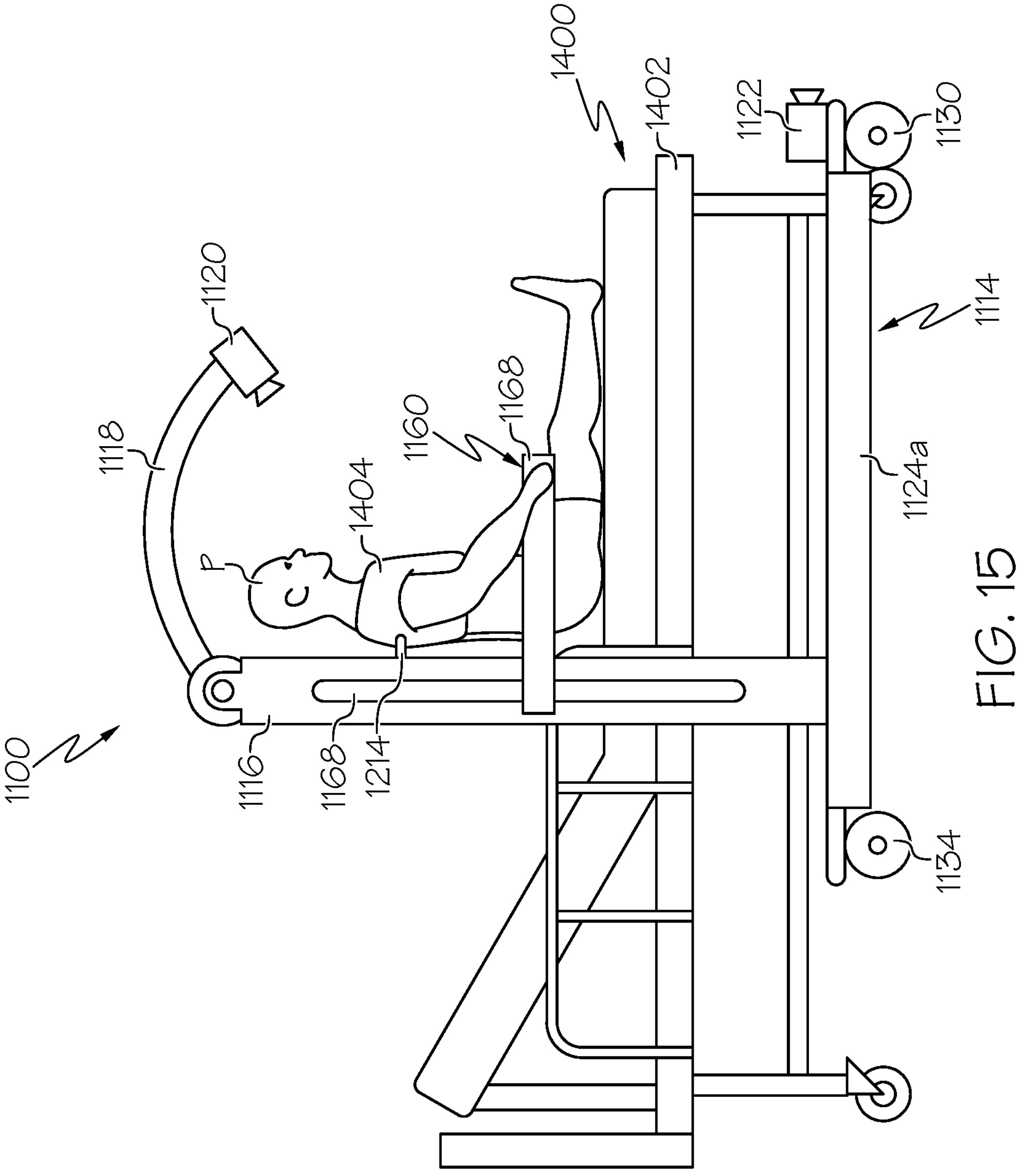
FIG. 15 schematically depicts a side view of the person support apparatus of FIG. 11 in a supporting state, according to one or more embodiments shown and described herein.

Referring now to FIG. 15, the person support apparatus 1100 is shown in a supporting state. Specifically, in the supporting state, the first arm 1160 is raised via the arm track 1168. This allows the person P to support themselves as they move from the bed 1400 and into the person support apparatus 1100. By raising the first arm 1160, the person P is able to grip the second arm segment 1166 and ensure that the person support apparatus 1100 is properly positioned relative to the bed 1400 and aid in supporting the body weight of the person P as the person P attempts to move into a standing position.

Figure 16:
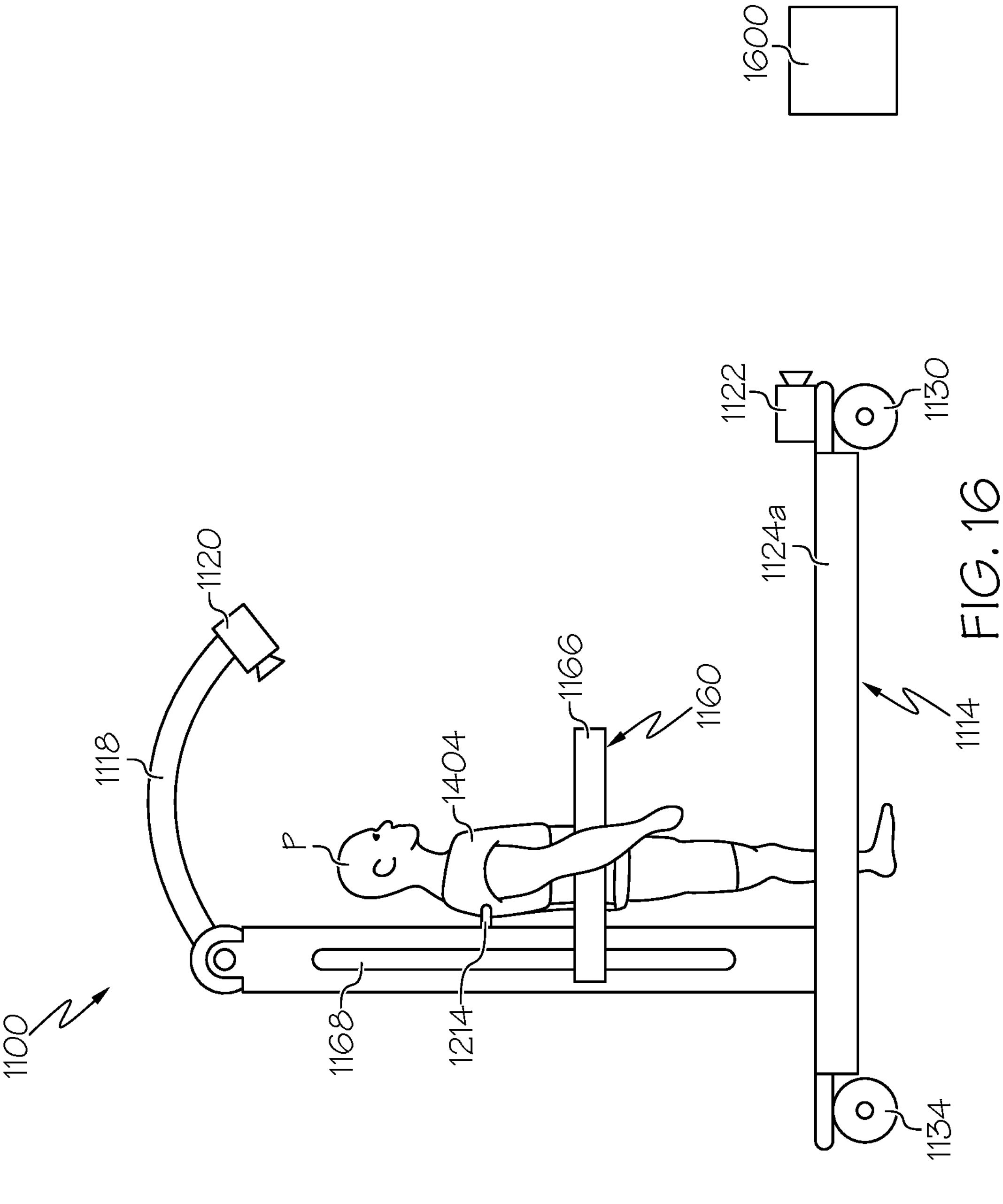
FIG. 16 schematically depicts a side view of the person support apparatus of FIG. 11 in a walking state, according to one or more embodiments shown and described herein.

Referring now to FIG. 16, the person support apparatus 1100 is shown in a walking state. Specifically, in the walking state, the first arm 1160 and the second arm 1162 (FIG. 11) are moved via the arm tracks 1168 into position relative to the person P. With the person image capture device 1120, a height of the person P may be determined such that the first arm 1160 and the second arm 1162 are properly positioned under the arms of the person P, at a vertical height corresponding to an elbow of the person P such that the person P may be able to support their forearms on the first arm 1160 and the second arm 1162 of the person support apparatus 1100. Additionally, in response to determining the height of the person P, the tether track 1176 may be adjusted to properly position the tether assembly 1174 relative to the person P. When in the walking state, the person P is positioned between the first arm 1160 and the second arm 1162, and the legs of the person P are positioned between the base legs 1124*a*, 1124*b*. As such, the person image capture device 1120 is directed toward the person P to collect data pertaining to a walking routine of the person, as described in detail herein. Additionally, the obstacle image capture device 1122 is directed away from the person P, e.g., the mast 1116, and in a direction of a moving path of the person support apparatus 1100, e.g., the walking path of the person P.

Figure 17:
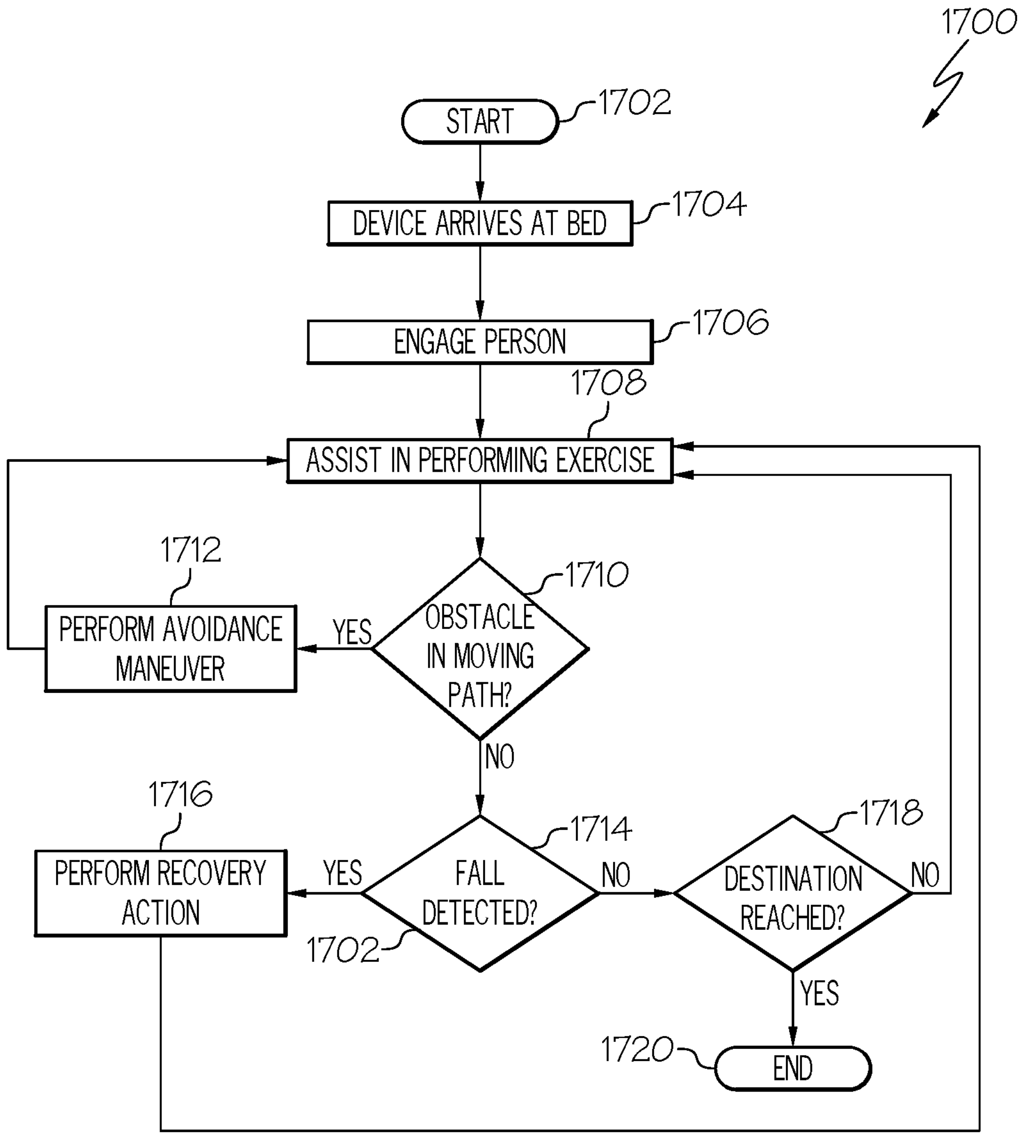
FIG. 17 depicts a flowchart of a method for operating the person support apparatus of FIG. 11, according to one or more embodiments shown and described herein.

Referring now to FIG. 17, a method 1700 for operating the person support apparatus 1100 is depicted. The method 1700 is described herein with reference to FIGS. 11-16. Initially, at step 1702, the method 1700 starts by receiving instructions a walking routine is to be performed. The walking routine may be provided to the person support apparatus 1100 by a caregiver or a person seeking to perform the walking routine. Alternatively, the walking routine may be provided to the person support apparatus 1100 wirelessly from the central monitoring station 1302 via the network 1304 and the network interface hardware 1314 or directly via the user interface 1178.

At step 1704, the person support apparatus 1100 is positioned and arrives at the bed 1400 on which the person P is situated. In embodiments in which the person support apparatus 1100 has autonomous or semi-autonomous capabilities, the person support apparatus 1100 may be instructed to move to a location of the bed 1400 based on known location of the bed 1400 within the room in which the person support apparatus 1100 is located. Additionally, the person support apparatus 1100 may be manually positioned along a side of the bed 1400 for the person P to easily access the person support apparatus 1100.

At step 1706, the person support apparatus 1100 receives and/or engages the person P at the bed 1400. Specifically, once the person support apparatus 1100 arrives at the bed 1400 or, in some embodiments, as the person support apparatus 1100 moves toward the bed 1400, the person support apparatus 1100 is positioned into the receiving state. As described herein and with reference to FIG. 14, the person support apparatus 1100 is positioned into the received state by lowering the first arm 1160 and positioning the second arm 1162 into the opened position P2, P4. Alternatively, the second arm 1162 may be lowered along with the first arm 1160 such that the arms 1160, 1162 fit beneath the mattress 1402 of the bed 1400. This allows the person P to slide off of the bed 1400 and into the person support apparatus 1100 without being obstructed by the first arm 1160 or the second arm 1162. Additionally, the harness 1404 worn by the person P is connected to the attachment mechanism 1218 of the tether 1214 so that the person P is coupled to the person support apparatus 1100. Thereafter, the person support apparatus 1100 moves into the supporting state by raising the first arm 1160 to allow the person P to support their weight. While supporting themselves on the person support apparatus 1100, the person P moves off of the bed 1400 to stand between the base legs 1124*a*, 1124*b*. Once properly positioned within the person support apparatus 1100, the person support apparatus 1100 moves into the walking state by rotating the second arm 1162 into the closed position. It should be appreciated that the position of the person support apparatus 1100 relative to the bed 1400 determines the operation of the first arm 1160 and the second arm 1162. For example, if the person support apparatus 1100 were to be positioned on an opposite side of the bed 1400 or face the opposite direction (e.g., the head of the bed versus the foot of the bed), the operation of the first arm 1160 and the second arm 1162 may be opposite.

At step 1708, the person support apparatus 1100 assists in performing a walking routine or exercise. Specifically, in embodiments, in which the person support apparatus 1100 is a passively operated system, the person support apparatus 1100 is moved under the power of the person P using the person support apparatus 1100. For example, the person P may grip the first arm 1160 and the second arm 1162 of the person support apparatus 1100 to be pulled in the walking direction of the person P. Alternatively, in embodiments in which the person support apparatus 1100 has autonomous or semi-autonomous driving capabilities, as discussed herein, the person support apparatus 1100 may guide the person P along the moving path indicated in the instructions received at step 1702. Additionally, the guidance provided by the person support apparatus 1100 may satisfy any duration requirements provided in the instructions received at step 1702 such as, for example, guiding the person P for 3 minutes, 5 minutes, 10 minutes, or any other length of time.

During either passive or autonomous/semi-autonomous operation of the person support apparatus 1100, at step 1710, the obstacle image capture device 1122 is operated to capture image data in front of the person support apparatus 1100 and within the moving path of the person support apparatus 1100. Subsequently, a determination is made as to whether an obstacle, such as the obstacle 1600 (FIG. 16) is in the moving path of the person support apparatus 1100. It should be appreciated that step 1710 is similar to step 1012 and step 1014 (FIG. 10) described herein. Specifically, the obstacle image capture device 1122 transmits the collected image data to a processor, which analyzes the collected image data, alone or in combination with an AI analysis module, to determine whether the obstacle 1600 is present within the moving path of the person support apparatus 1100. Further, at step 1710, a determination may be made as to whether the obstacle 1600 is moving, as described herein.

If it is determined at step 1710 that the obstacle 1600 is in the moving path of the person support apparatus 1100, the person support apparatus 1100 performs an avoidance maneuver at step 1712. In embodiments in which the person support apparatus 1100 is passively moved by the person P, the avoidance maneuver may include displaying an indication on the ground in front of the person support apparatus 1100 to draw attention to the obstacle 1600. For example, the obstacle image capture device 1122, which may include an image projection device, as described herein, may project an indicia on the ground highlighting the obstacle and/or display an intended moving path for the person support apparatus 1100 to follow to avoid the obstacle 1600, such as disclosed at step 1018 (FIG. 10). In embodiments in which the person support apparatus 1100 has autonomous or semi-autonomous driving capabilities, the person support apparatus 1100 may initiate one or more avoidance maneuver operations to redirect a moving path of the person support apparatus 1100, such as disclosed at step 1016 (FIG. 10). For example, the person support apparatus 1100 may change a moving direction of the casters 1130, 1132, 1134, 1136 to change a moving direction of the person support apparatus 1100, or apply the caster brakes to the casters 1130, 1132, 1134, 1136 to prevent further movement of the person support apparatus 1100.

Alternatively, if it is determined at step 1710 that there is not an obstacle in the moving path of the person support apparatus 1100, the method 1700 proceeds to step 1714 at which the person support apparatus 1100 determines whether a fall by the person P is detected. As described herein, person image capture device 1120 continuously captures image data of the person P during operation of the person support apparatus 1100. For example, the person image capture device 1120 captures a gait of the person P, a height of the person P, and the like. Changes in the gait of the person P during use of the person support apparatus 1100, for example, swaying, irregular center of gravity, incorrect placement of the foot and/or leg of the person P, and the like, may be indicative that the person P is about to fall. Similarly, changes in the height of the person P, i.e., the vertical position of the head of the person P, may be indicative that the person P is falling. As described herein, a fall may also be detected based upon the tether assembly 1174 detecting a tension force on the tether 1214 exceeding a threshold force such that the person P is pulling on the tether 1214 by the harness 1404 on the attachment mechanism 1218.

If it is determined at step 1714 that the person P is falling, based upon data collected by the person image capture device 1120 and/or the tension force applied at the tether assembly 1174, i.e., the tension detected by the tension sensor 1224 is equal to or exceeds the predetermined threshold, the person support apparatus 1100 performs a recovery action at step 1716. In embodiments, the recovery action may include, for example, applying the caster brakes to the casters 1130, 1132, 1134, 1136, sounding an alarm, operating the motor 1222 of the tether assembly 1174 to prevent rotation of the roller 1212, and/or operating the motor 1222 to rotate the roller 1212 in an opposite direction to draw the tether 1214 back into the housing 1200 of the tether assembly 1174.

Alternatively, if it is determined at step 1714 that the person P is not falling, based upon the data collected by the person image capture device 1120 and/or the tension force applied at the tether assembly 1174, i.e., the tension detected by the tension sensor 1224 is less than the predetermined threshold, the method 1700 proceeds to step 1718 to determine whether the destination has been reached. The destination may be provided by the instructions received at step 1702 or indicated by the person P operating the person support apparatus 1100 upon arriving at the destination. If it is determined at step 1718 that the destination has been reached, the method 1700 ends at step 1720 such that the person support apparatus 1100 deactivates further operation. Alternatively, if it is determined at step 1718 that the destination has not been reached, the method 1700 returns to step 1708 to continue assisting in performing the walking routine or exercise.

From the above, it is to be appreciated that defined herein is a person support apparatus and method for using that identifies an object within a room in which the person support apparatus is located and alerts an appropriate person of the object when classified as a potential hazard to reduce the likelihood that a person might slip and fall on the object. The person support apparatus includes an image capture device that captures image data within the room, an image projection device for emitting a projection beam onto a floor surface of the room, and a controller coupled to the image capture device and the image projection device. The controller is configured to analyze the image data captured by the image capture device, determine an object is present in the room based on image data captured by the image capture device, and in response to classifying the object as a potential hazard, instruct the image projection device to emit a projection beam onto the floor surface of the room to illuminate the object classified as a potential hazard. Accordingly, attention may be drawn to the object on the floor surface such that the potentially hazardous object may be remediated, such as cleaning or removal, and that any person walking within the room may be alerted to avoid the potentially hazardous object.

Further aspects of the embodiments described herein are provided by the subject matter of the following clauses:

Clause 1. An apparatus comprising: a controller configured to: analyze image data; determine an object is present in the area based on the image data; determine if the object is a potential hazard based on the image data; and in response to determining the object is a potential hazard, emitting a projection beam onto a surface of the area to illuminate the object.

Clause 2. The apparatus of clause 1, further comprising: a person support apparatus comprising: an image capture device for capturing the image data within the area; an image projection device for emitting the projection beam onto the surface of the area; a support frame having a bottom surface; and a mirrored dome mounted on the bottom surface of the support frame, wherein the image capture device and the image projection device are mounted on the person support apparatus below the mirrored dome and have a field of view directed upward toward the mirrored dome.

Clause 3. The apparatus of clause 2, further comprising an alarm device, wherein the controller is coupled to the alarm device and configured to operate the alarm device to provide an audible alert in response to determining the object classified as the potential hazard is present.

Clause 4. The apparatus of clause 3, wherein one or more of a frequency and volume of the audible alert increases as a function of time since the object classified as the potential hazard is detected.

Clause 5. The apparatus of any one of clauses 2-4, wherein the controller is further configured to determine that a person is present in the area and, in response to determining the person is present, operate the image projection device to project a second projection beam onto the surface of the area to indicate a path for the person to avoid the potential hazard, the surface being a floor surface.

Clause 6. The apparatus of clause 5, wherein the controller is further configured to determine a location of the person support apparatus within the area.

Clause 7. The apparatus of clause 6, wherein the controller is configured to detect a presence of one or more location indicators within the area and determine the location of the person support apparatus based on known locations of the one or more location indicators within the area.

Clause 8. The apparatus of clause 5 or clause 6, wherein the second projection beam indicates a path between the person support apparatus and at least one of a door or a bathroom of the area.

Clause 9. The apparatus of any one of clauses 1-8, wherein the controller is further configured to: determine that the object classified as the potential hazard is no longer present; determine a length of time that the object classified as the potential hazard was present; and transmit area identifying information and the length of time to a central monitoring station.

Clause 10. An apparatus comprising: a controller configured to: determine that the apparatus is moving based on moving data; and instruct an image projection device to emit a projection beam indicating a moving direction of the apparatus based on the moving data.

Clause 11. The apparatus of clause 10, further comprising a drive mechanism and a plurality of casters, the drive mechanism communicatively coupled to one or more of the plurality of casters to detect movement of the apparatus.

Clause 12. The apparatus of clause 11, wherein the drive mechanism detects a moving speed of the apparatus, and wherein the controller is further configured to adjust the projection beam based on the moving speed of the apparatus.

Clause 13. The apparatus of clause 12, wherein the controller is further configured to instruct the image projection device to emit the projection beam at a first distance in front of the apparatus in response to the drive mechanism detecting that the apparatus is moving at a first speed, and wherein the controller is further configured to instruct the image projection device to emit the projection beam at a second distance in front of the apparatus less than the first distance in response to the drive mechanism detecting that the apparatus is moving at a second speed less than the first speed.

Clause 14. The apparatus of any one of clauses 11-13, wherein the drive mechanism detects a moving direction of the apparatus, and wherein the controller is further configured to adjust the projection beam based on the moving direction of the apparatus.

Clause 15. The apparatus of clause 14, wherein the controller is further configured to instruct the image projection device to emit the projection beam to indicate a first turning direction in front of the apparatus in response to the drive mechanism detecting that the apparatus is turning in the first turning direction, and wherein the controller is further configured to instruct the image projection device to emit the projection beam to indicate a second turning direction in front of the apparatus in response to the drive mechanism detecting that the apparatus is turning in the second turning direction.

Clause 16. The apparatus of any one of clauses 10-15, further comprising an image capture device for capturing image data, and wherein the controller is further configured to determine an obstacle is present based on the captured image data.

Clause 17. The apparatus of clause 16, wherein the controller is further configured to determine whether the obstacle is moving based on the captured image data.

Clause 18. The apparatus of clause 17, wherein the controller is further configured to instruct the image projection device to change a direction of the projection beam to avoid the obstacle in response to determining that the obstacle is not moving.

Clause 19. The apparatus of clause 17 or clause 18, wherein the controller is further configured to instruct the image projection device to project a second projection beam indicating a direction of movement of the obstacle to avoid the apparatus.

Clause 20. A method for detecting a hazardous object proximate a person support apparatus comprising: capturing image data within an area; analyzing the captured image data; determining an object is present in the area based on captured image data; determining if the object is a potential hazard based on the captured image data; and in response to determining the object is a potential hazard, emitting a projection beam onto the surface of the area to illuminate the object.

Clause 21. The method of clause 20, further comprising directing an image capture device and an image projection device such that a field of view of the image capture device and a field of view of the image projection device is directed upward toward a mirrored dome mounted on a bottom surface of a support frame of the person support apparatus.

Clause 22. The method of clause 20 or clause 21, further comprising operating an alarm device to provide an audible alert in response to determining the object classified as the potential hazard is present.

Clause 23. The method of clause 22, further comprising increasing one or more of a frequency and volume of the audible alert as a function of time since the object classified as the potential hazard is detected.

Clause 24. The method of any one of clauses 20-23, further comprising: determining that a person is present in the area; and in response to determining the person is present in the area, operating an image projection device to emit a second projection beam onto the surface of the area to indicate a path for the person to avoid the potential hazard, the surface being a floor surface.

Clause 25. The method of clause 24, further comprising determining a location of the person support apparatus within the area.

Clause 26. The method of clause 25, further comprising: detecting a presence of one or more location indicators within the area; and determining the location of the person support apparatus based on known locations of the one or more location indicators within the area.

Clause 27. The method of any one of clauses 24-26, wherein the second projection beam indicates a path between the person support apparatus and at least one of a door or bathroom of the area.

Clause 28. The method of any one of clauses 20-27, further comprising: determining that the potential hazard is no longer present; determining a length of time that the potential hazard was present; and transmitting area identifying information and the length of time to a central monitoring station.

Clause 29. A person support apparatus comprising: a base including a pair of legs and a plurality of rollers mounted on each leg of the pair of legs; a mast extending upwardly from the base; a tether assembly extending from the mast, the tether assembly including a roller, a tether wound around the roller, and a tension sensor for detecting an amount of tension applied on the tether in a direction opposite the roller; a pair of arms extending from the mast; and a person image capture device having a field of view directed toward the mast.

Clause 30. The person support apparatus of clause 29, wherein the tether includes a first end fixed to the roller and a second end opposite the first end, an attachment mechanism provided at the second end of the tether for coupling the tether to a wearable device.

Clause 31. The person support apparatus of clause 29 or clause 30, wherein the tether assembly includes a motor for controlling rotation of the roller, the motor is communicatively coupled to the tension sensor.

Clause 32. The person support apparatus of clause 29, wherein the motor permits rotation of the roller in a first direction when the tension sensor detects tension below a predetermined threshold.

Clause 33. The person support apparatus of clause 32, wherein the motor prohibits rotation of the roller in the first direction when the tension sensor detects tension at equal to or exceeding the predetermined threshold.

Clause 34. The person support apparatus of any one of clauses 29-33 1, further comprising a neck extending from an end of the mast opposite the base, the person image capture device is mounted to an end of the neck opposite the mast.

Clause 35. The person support apparatus of any one of clauses 31-34, wherein the person image capture device collects data pertaining to a gait of a person utilizing the person support apparatus.

Clause 36. The person support apparatus of clause 35, wherein the motor permits rotation of the roller in a first direction when the data collected by the person image capture device indicates a fall event is not occurring.

Clause 37. The person support apparatus of clause 36, wherein the motor prohibits rotation of the roller in the first direction when the data collected by the person image capture device indicates a fall event is occurring.

Clause 38. The person support apparatus of any one of clauses 29-37, wherein each arm of the pair of arms includes a first arm segment extending from the mast and a second arm segment extending from the first arm segment, the second arm segment rotatable relative to the first arm segment, the pair of arms are movable in a vertical direction along the mast.

Clause 39. A method comprising: operating a person support apparatus to engage a person, the person support apparatus including: a base including a pair of legs and a plurality of rollers mounted on each leg of the pair of legs; a mast extending upwardly from the base; a tether assembly extending from the mast, the tether assembly including a roller, a tether wound around the roller, and a tension sensor for detecting an amount of tension applied on the tether in a direction opposite the roller; a pair of arms extending from the mast; and a person image capture device having a field of view directed toward the mast; collecting data at the person image capture device of the person engaged with the person support apparatus to detect a fall event; and controlling rotation of the roller in response to detecting a fall event is occurring.

Clause 40. The method of clause 39, wherein operating the person support apparatus to engage the person includes coupling an attachment mechanism provided at an end of the tether opposite the roller to a wearable device worn by the person.

Clause 41. The method of clause 39 or clause 40, wherein the tether assembly includes a motor for controlling rotation of the roller, the motor is communicatively coupled to the tension sensor.

Clause 42. The method of clause 41, further comprising operating the motor to permit rotation of the roller in a first direction when the tension sensor detects tension below a predetermined threshold.

Clause 43. The method of clause 42, further comprising operating the motor to prohibit rotation of the roller in the first direction when the tension sensor detects tension at equal to or exceeding the predetermined threshold.

Clause 44. The method of any one of clauses 39-43, further comprising mounting the person image capture device to an end of a neck extending from an end of the mast opposite the base.

Clause 45. The method of any one of clauses 41-44, further comprising collecting data at the person image capture device pertaining to a gait of the person.

Clause 46. The method of clause 45, further comprising operating the motor to permit rotation of the roller in a first direction when the data collected by the person image capture device indicates a fall event is not occurring.

Clause 47. The method of clause 46, further comprising operating the motor to prohibit rotation of the roller in the first direction when the data collected by the person image capture device indicates a fall event is occurring.

Clause 48. The method of any one of clauses 39-47, wherein each arm of the pair of arms includes a first arm segment extending from the mast and a second arm segment extending from the first arm segment, the second arm segment rotatable relative to the first arm segment, the pair of arms are movable in a vertical direction along the mast.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An apparatus comprising:

an optical projection system comprising:

an imaging device comprising:

an image capture device for capturing image data within an area; and an image projection device for emitting a projection beam onto a surface of the area; and a reflective surface, wherein the image capture device and the image projection device are mounted below the reflective surface and have a field of view directed upward toward the reflective surface; and a controller configured to:

analyze the image data within the area;

determine an object is present in the area based on the image data;

determine if the object is a potential hazard based on the image data; and in response to determining the object is a potential hazard, emitting the projection beam onto the surface of the area to illuminate the object.

2. The apparatus of claim 1, wherein the reflective surface comprises a mirrored dome mounted on a bottom surface of a support frame of a person support apparatus.

3. The apparatus of claim 2, further comprising an alarm device, wherein the controller is coupled to the alarm device and configured to operate the alarm device to provide an audible alert in response to determining the object classified as the potential hazard is present.

4. The apparatus of claim 3, wherein one or more of a frequency and volume of the audible alert increases as a function of time since the object classified as the potential hazard is detected.

5. The apparatus of claim 2, wherein the controller is further configured to determine that a person is present in the area and, in response to determining the person is present, operate the image projection device to project a second projection beam onto the surface of the area to indicate a path for the person to avoid the potential hazard, the surface being a floor surface.

6. The apparatus of claim 5, wherein the controller is further configured to determine a location of the person support apparatus within the area.

7. A method for detecting hazardous objects, the method comprising:

directing an image capture device and an image projection device such that a field of view of the image capture device and a field of view of the image projection device is directed upward toward a reflective surface;

capturing image data by the image capture device within an area;

analyzing the captured image data;

determining an object is present in the area based on captured image data;

determining if the object is a potential hazard based on the captured image data; and in response to determining the object is a potential hazard, emitting a projection beam by an image projection device onto a surface of the area to illuminate the object.

8. The method of claim 7, wherein the reflective surface comprises a mirrored dome mounted on a bottom surface of a support frame of a person support apparatus.

9. The method of claim 8, further comprising:

determining that a person is present in the area; and in response to determining the person is present in the area, operating an image projection device to emit a second projection beam onto the surface of the area to indicate a path for the person to avoid the potential hazard, the surface being a floor surface.

10. The method of claim 9, further comprising determining a location of the person support apparatus within the area.

11. The method of claim 7, further comprising operating an alarm device to provide an audible alert in response to determining the object classified as the potential hazard is present.

12. The method of claim 11, further comprising increasing one or more of a frequency and volume of the audible alert as a function of time since the object classified as the potential hazard is detected.

* * * * *